(12) United States Patent
Miyoshi

(10) Patent No.: US 8,583,848 B2
(45) Date of Patent: Nov. 12, 2013

(54) SWITCHING CIRCUIT CONNECTED TO AN I/O DEVICE, AND SWITCHING CIRCUIT CONNECTED TO AN I/O DEVICE CONTROL METHOD

(75) Inventor: Takashi Miyoshi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 186 days.

(21) Appl. No.: 13/195,345

(22) Filed: Aug. 1, 2011

(65) Prior Publication Data

US 2012/0036306 A1 Feb. 9, 2012

(30) Foreign Application Priority Data

Aug. 5, 2010 (JP) ................................ 2010-176593

(51) Int. Cl.
*G06F 13/00* (2006.01)
(52) U.S. Cl.
USPC .......................................... 710/313; 710/302
(58) Field of Classification Search
USPC .......................................... 710/302, 313, 316
See application file for complete search history.

(56) References Cited

U.S. PATENT DOCUMENTS 7,506,094 B2 * 3/2009 Boyd et al. .................... 710/316
2004/0187106 A1 9/2004 Tanaka et al.
2010/0199290 A1 * 8/2010 Kavanaugh ................... 719/327

FOREIGN PATENT DOCUMENTS

JP 09-237246 9/1997
JP 2004-252591 9/2004

* cited by examiner

*Primary Examiner* — Glenn A Auve
(74) *Attorney, Agent, or Firm* — Staas & Halsey LLP

(57) ABSTRACT

A switching circuit connected to an I/O device having a plurality of functions, the switching circuit comprising: a processing unit that includes tables, each of which corresponds to one of the function of the I/O device, when the processing unit receives a packet that instructs to add a function to the I/O device, configured to select the table that contains a bus number of a destination of the received packet, and configured to notify a number of the selected table; and a filter configured to change a function number of the destination of the received packet to the number of the table notified from the processing unit.

8 Claims, 21 Drawing Sheets

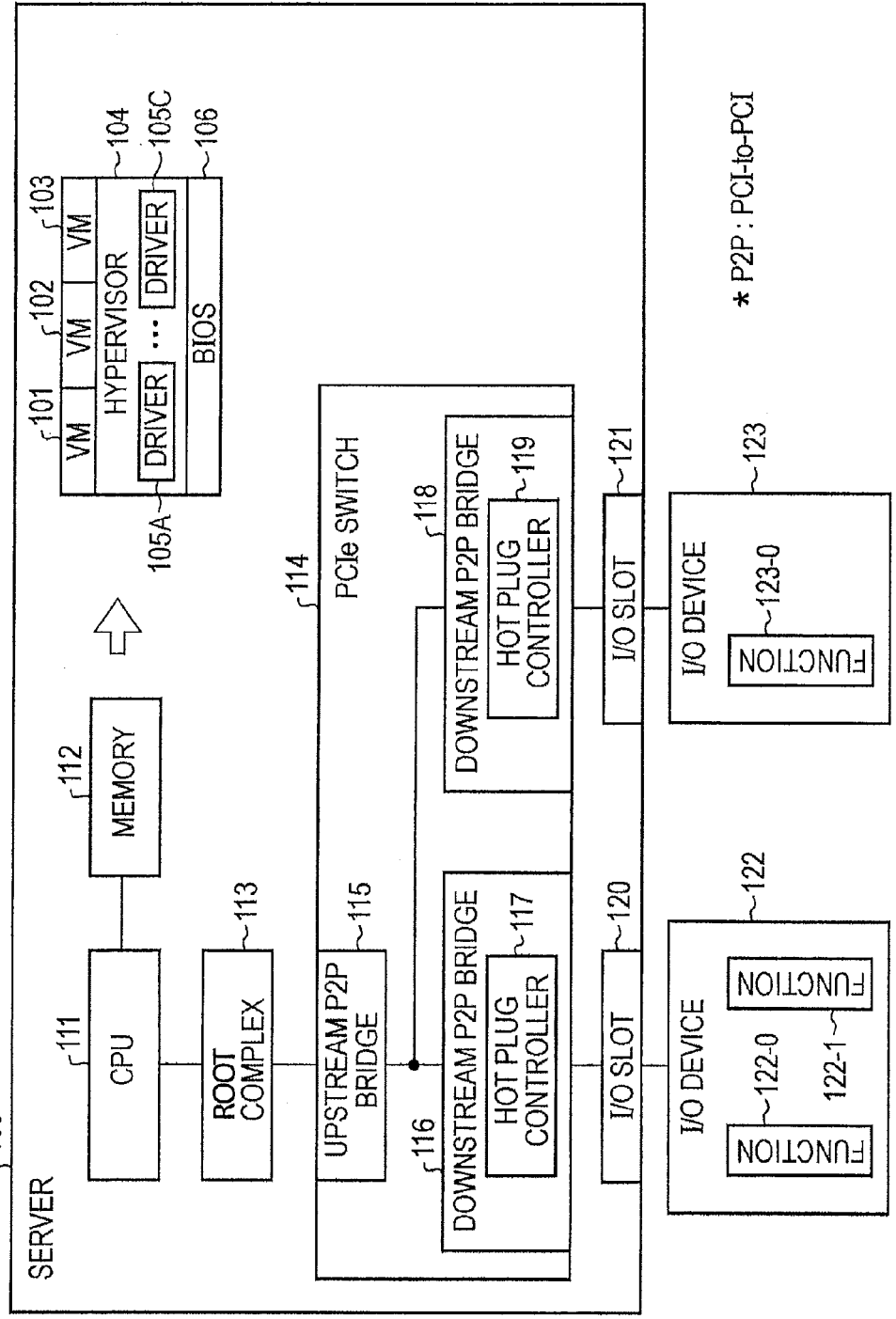

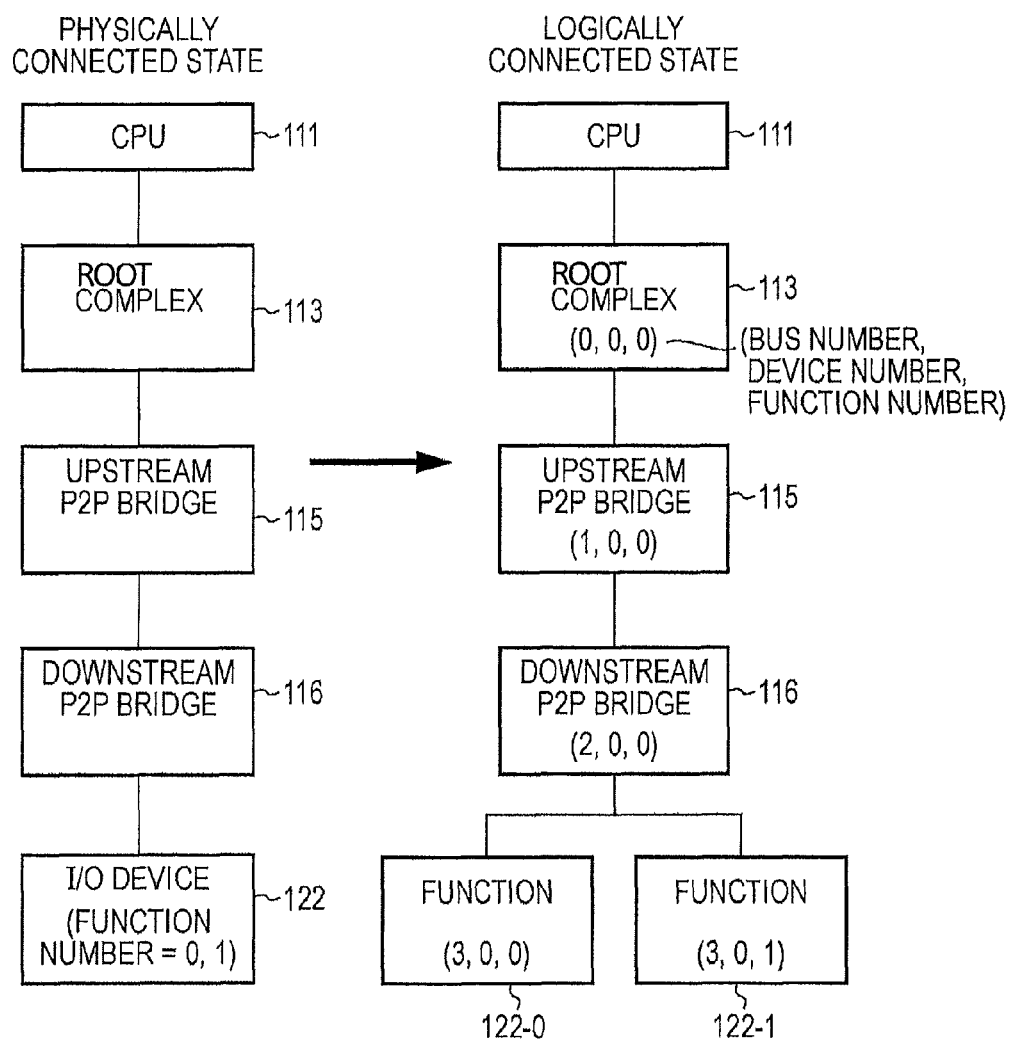
FIG. 2 RELATED ART

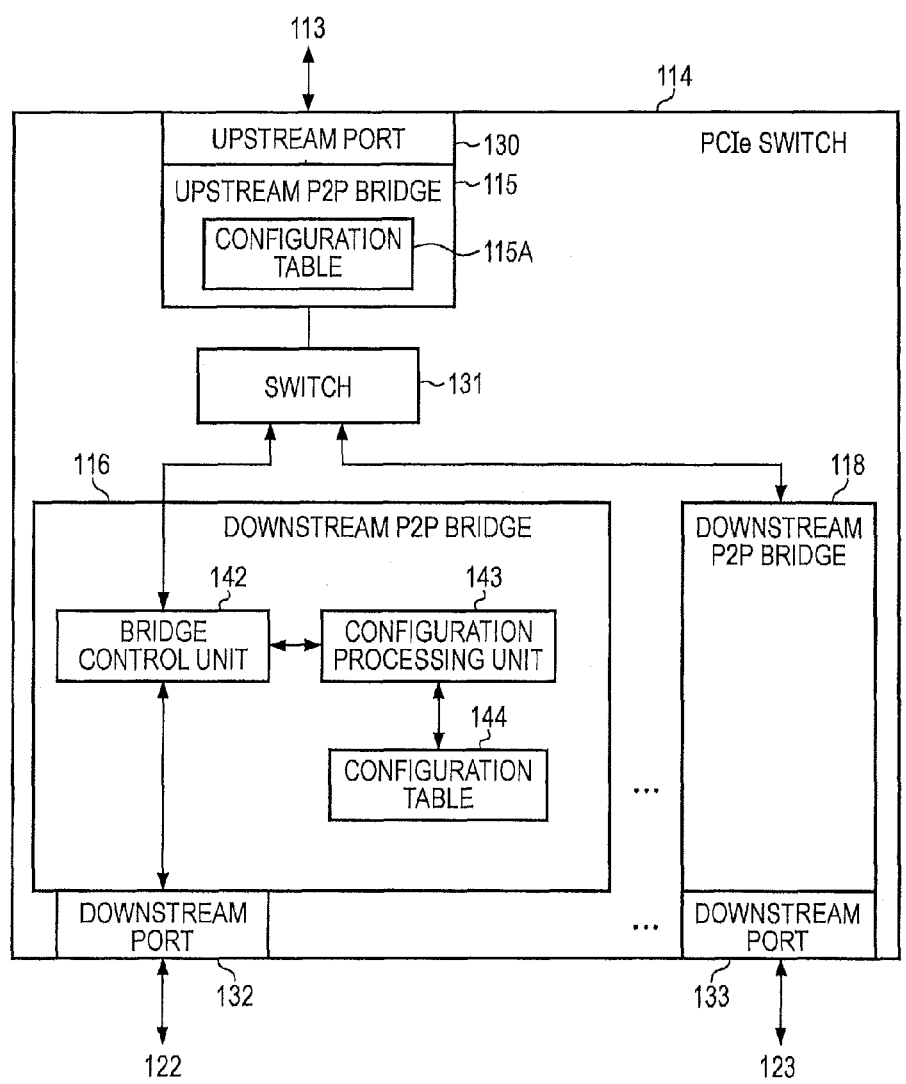
FIG. 3  RELATED ART

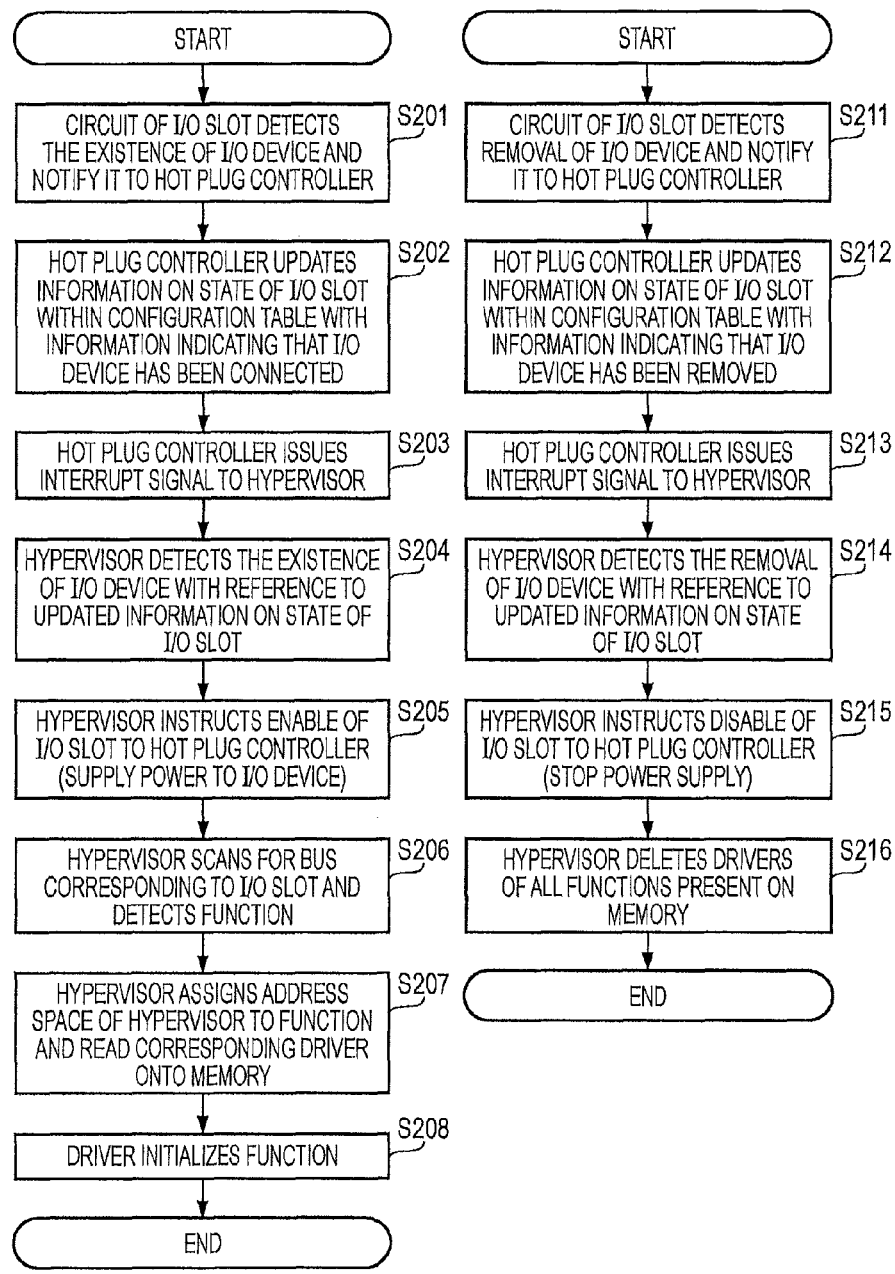
RELATED ART
FIG. 4A
RELATED ART
FIG. 4B

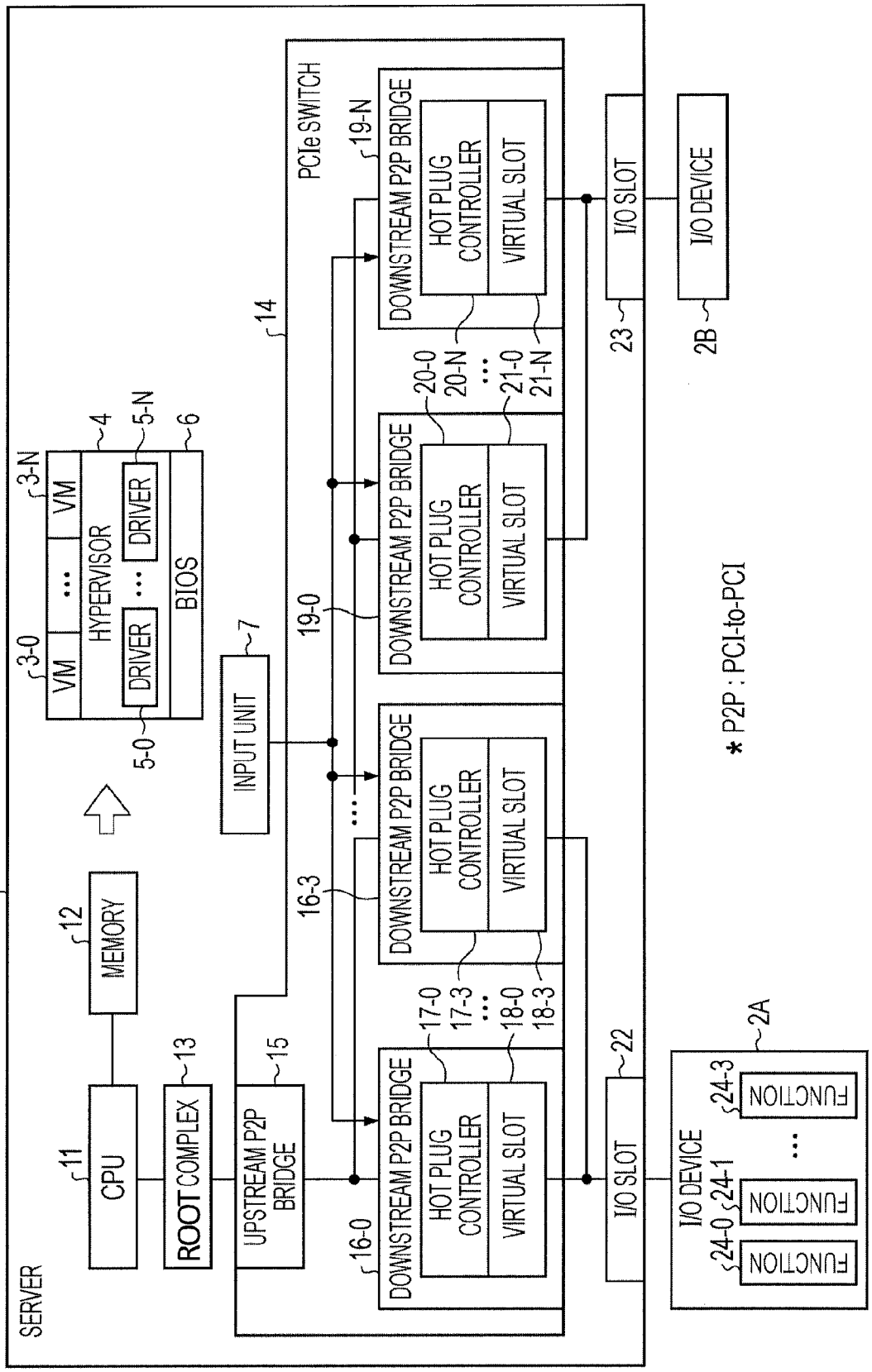

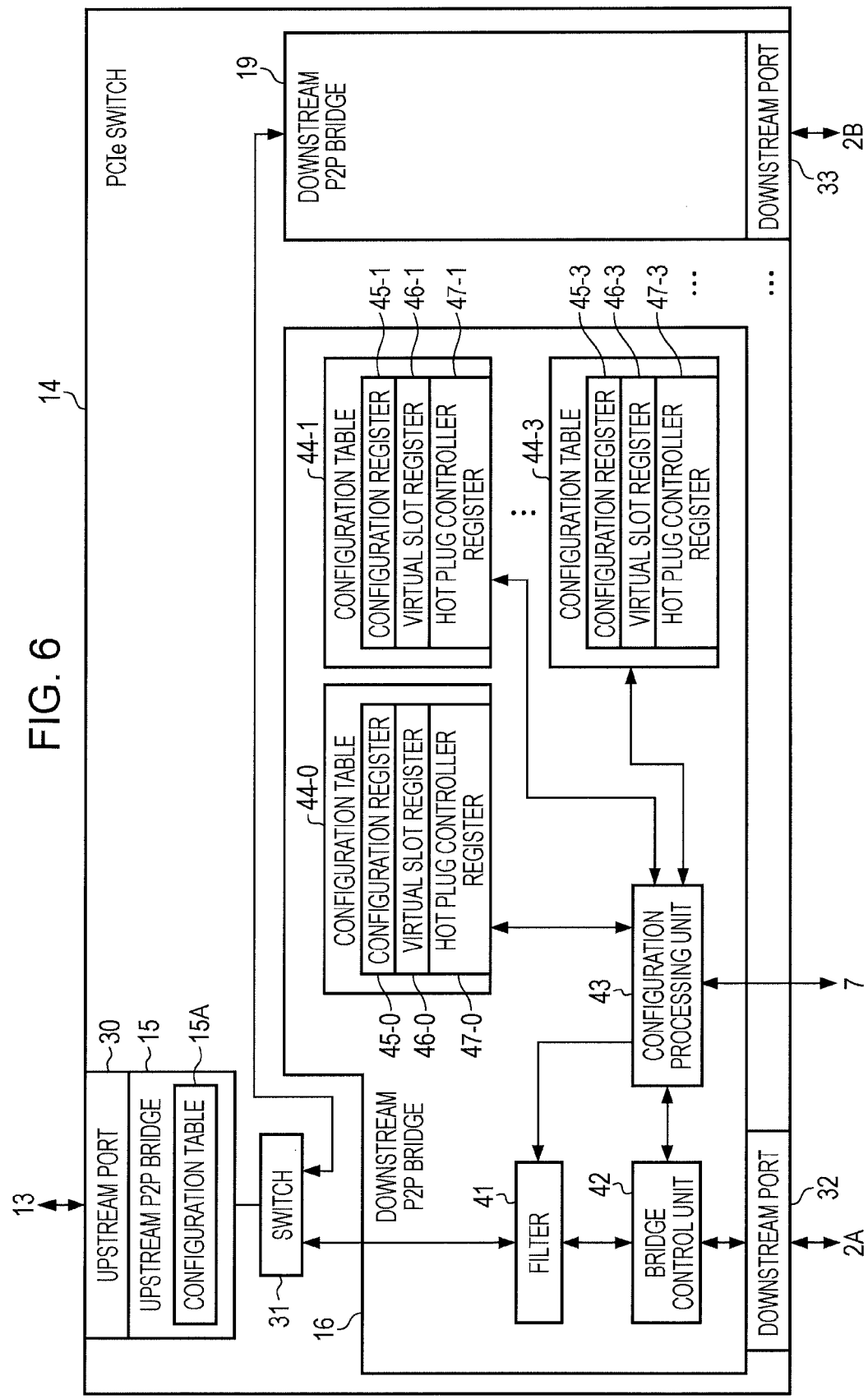
FIG. 6

FIG. 7A

|  | +0 | +1 | +2 | +3 |
|---|---|---|---|---|
|  | 7\|6\|5\|4\|3\|2\|1\|0 | 7\|6\|5\|4\|3\|2\|1\|0 | 7\|6\|5\|4\|3\|2\|1\|0 | 7\|6\|5\|4\|3\|2\|1\|0 |
| BYTE 0> | HEADER | | | |
| BYTE J> | DATA | | | |

FIG. 7B

|  | +0 | +1 | +2 | +3 |
|---|---|---|---|---|
|  | 7\|6\|5\|4\|3\|2\|1\|0 | 7\|6\|5\|4\|3\|2\|1\|0 | 7\|6\|5\|4\|3\|2\|1\|0 | 7\|6\|5\|4\|3\|2\|1\|0 |
| BYTE 0> | P\|Fmt\|TYPE | R\|TC\|R | T\|E\|R\|Attr\|AT D\|P | LENGTH |

FIG. 7C

| PACKET TYPE | Fmt | TYPE | DESCRIPTION |
|---|---|---|---|
| MRd | 00 | 0 0000 | MEMORY READ REQUEST |
|  | 01 |  |  |
| MWr | 10 | 0 0000 | MEMORY WRITE REQUEST |
|  | 11 |  |  |
| IORd | 00 | 0 0010 | I/O READ REQUEST |
| IOWr | 10 | 0 0010 | I/O WRITE REQUEST |
| CfgRd 0 | 00 | 0 0100 | CONFIGURATION READ TYPE 0 |
| CfgWr 0 | 10 | 0 0100 | CONFIGURATION WRITE TYPE 0 |
| CfgRd 1 | 00 | 0 0101 | CONFIGURATION READ TYPE 1 |
| CfgWr 1 | 10 | 0 0101 | CONFIGURATION WRITE TYPE 1 |
| ... | ... | ... | ... |

FIG. 8A

|  | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
|  | +0 | | | | | | | | +1 | | | | | | | | +2 | | | | | | | | +3 | | | | | | | |
| BYTE 0> | P | Fmt | | | TYPE | | | | R | | TC | | | R | | | TD | EP | Attr | | AT | | | | LENGTH | | | | | | | |
| BYTE 4> | REQUESTER ID | | | | | | | | | | | | | | | | Tag | | | | | | | | LAST DW BE | | | | 1ST DW BE | | | |
| BYTE 8> | ADDRESS | | | | | | | | | | | | | | | | | | | | | | | | | | | | | | | R |

FIG. 8B

|  | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
|  | +0 | | | | | | | | +1 | | | | | | | | +2 | | | | | | | | +3 | | | | | | | |
| BYTE 0> | P | Fmt | | | TYPE | | | | R | | TC | | | R | | | TD | EP | Attr | | AT | | | | LENGTH | | | | | | | |
| BYTE 4> | REQUESTER ID | | | | | | | | | | | | | | | | Tag | | | | | | | | LAST DW BE | | | | 1ST DW BE | | | |
| BYTE 8> | BUS NUMBER | | | | | | | | DEVICE NUMBER | | | | | FUNCTION NUMBER | | | RESERVED | | | | EXT. REG. NUMBER | | | | REGISTER NUMBER | | | | | R | | |

| DEVICE ID | | VENDOR ID | |
|---|---|---|---|
| STATUS | | COMMAND | |
| CLASS CODE | | | REVISION ID |
| BIST | HEADER TYPE | PRIMARY LATENCY TIMER | CACHELINE SIZE |
| BASE ADDRESS REGISTER 0 | | | |
| BASE ADDRESS REGISTER 1 | | | |
| SECONDARY LATENCY TIMER | SUBORDINATE BUS NUMBER | SECONDARY BUS NUMBER | PRIMARY BUS NUMBER |
| SECONDARY STATUS | | I/O LIMIT | I/O BASE |
| MEMORY LIMIT | | MEMORY BASE | |
| PREFETCHABLE MEMORY LIMIT | | PREFETCHABLE MEMORY BASE | |
| PREFETCHABLE BASE UPPER 32 BITS | | | |
| PREFETCHABLE LIMIT UPPER 32 BITS | | | |
| I/O LIMIT UPPER 16 BITS | | I/O BASE UPPER 16 BITS | |
| RESERVED | | | CAPABILITIES POINTER |
| EXPANSION ROM BASE ADDRESS | | | |
| BRIDGE CONTROL | | INTERRUPT PIN | INTERRUPT LINE |

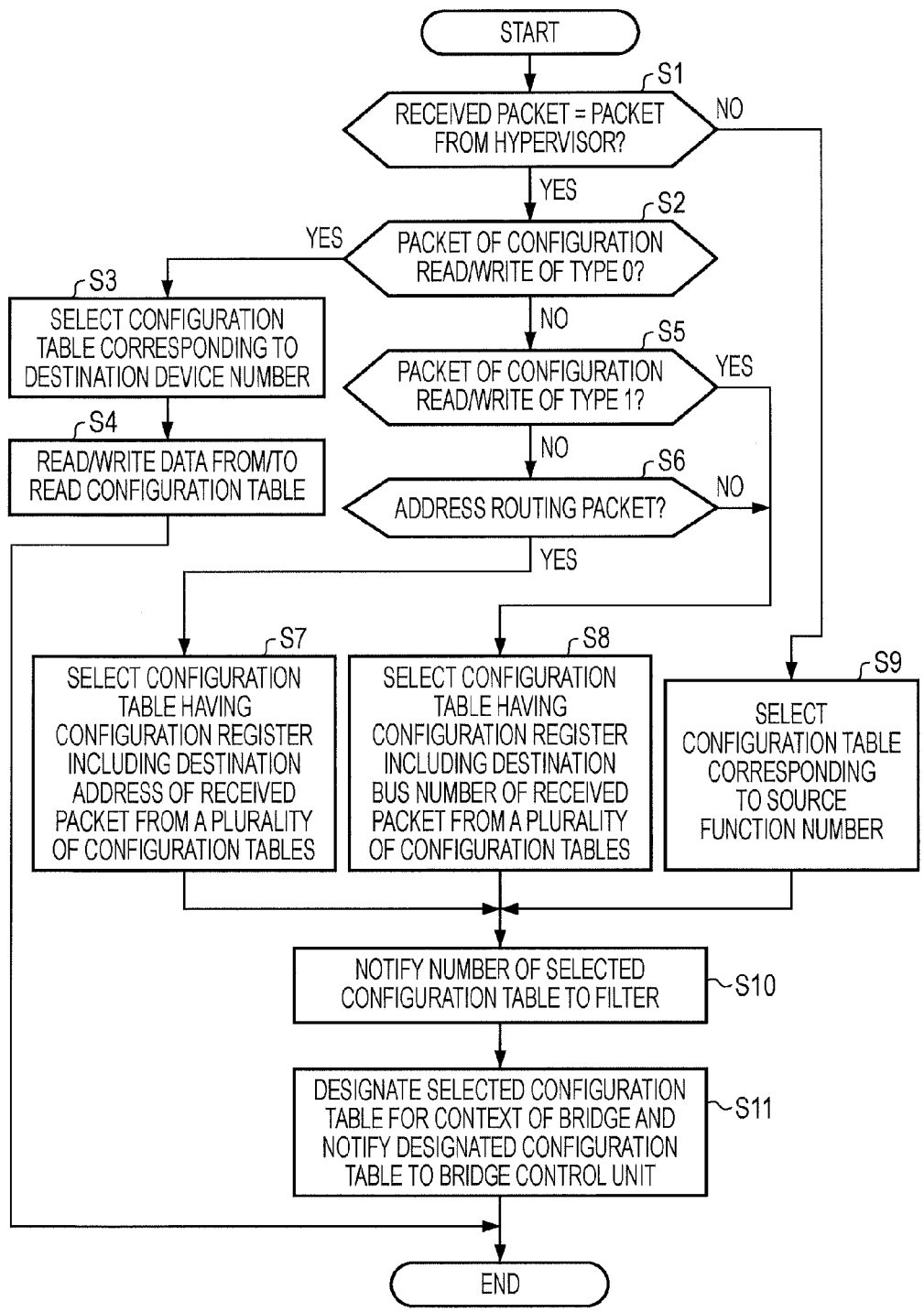
FIG. 10

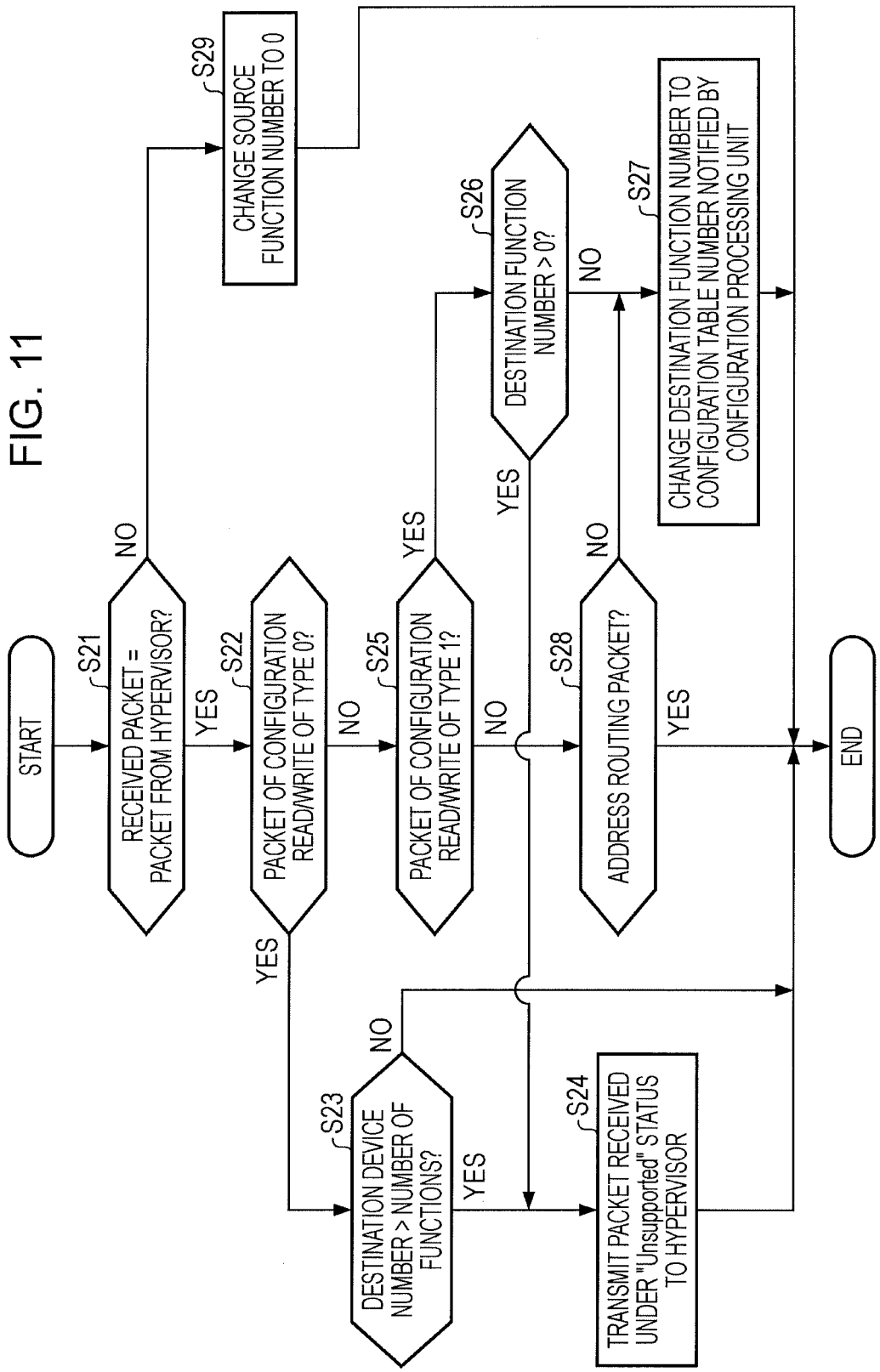
FIG. 11

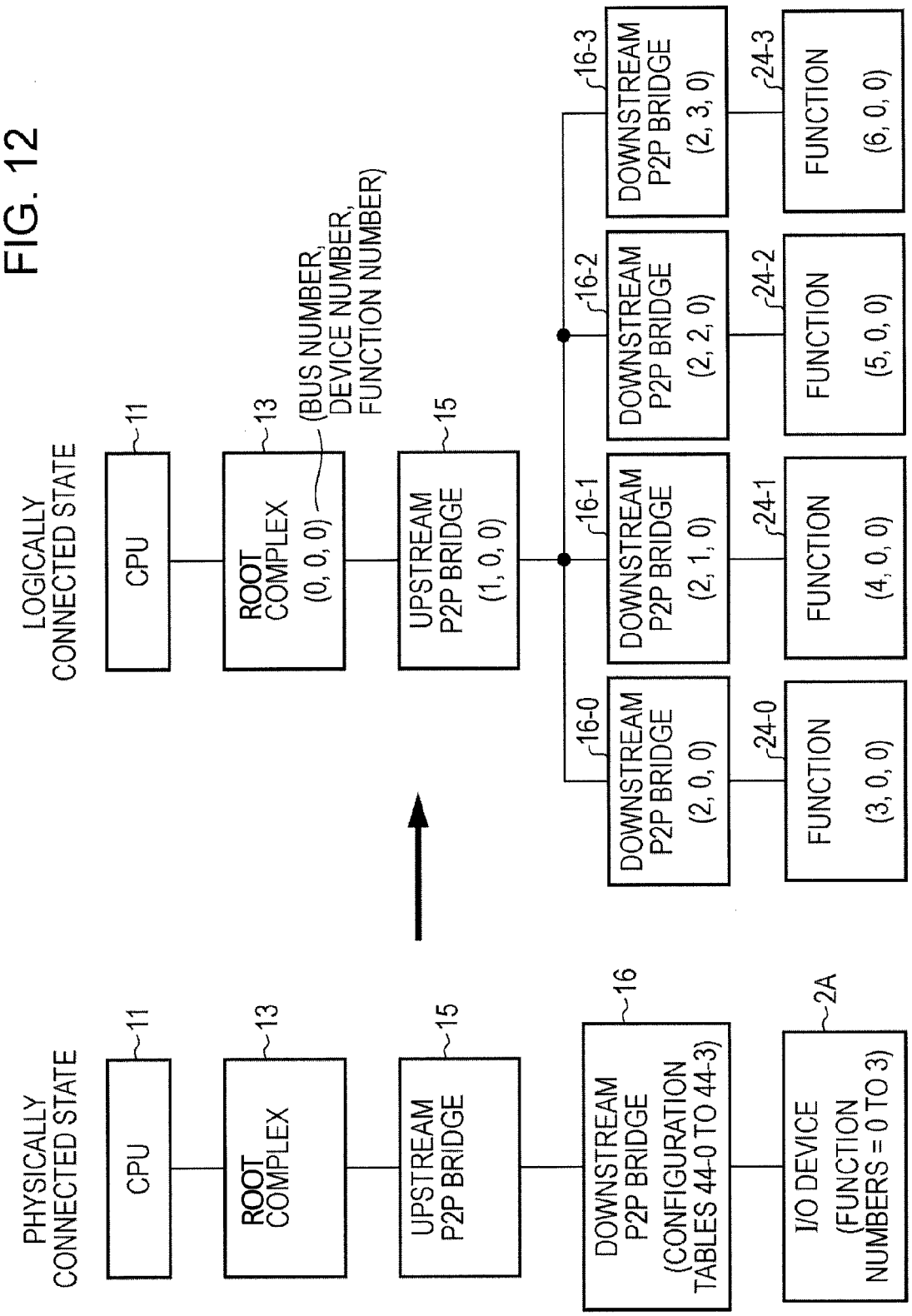

FIG. 13

| P2P BRIDGE | PRIMARY BUS NUMBER | SECONDARY BUS NUMBER | SUBORDINATE BUS NUMBER | MEMORY BASE | MEMORY LIMIT |
|---|---|---|---|---|---|
| UPSTREAM P2P BRIDGE 15 | 1 | 2 | 6 | 0xE0000000 | 0xEFFFFFFF |
| DOWNSTREAM P2P BRIDGE 16-0 | 2 | 3 | 3 | 0xE4000000 | 0xE4FFFFFF |
| DOWNSTREAM P2P BRIDGE 16-1 | 2 | 4 | 4 | 0xE5000000 | 0xE5FFFFFF |
| DOWNSTREAM P2P BRIDGE 16-2 | 2 | 5 | 5 | 0xE6000000 | 0xE6FFFFFF |
| DOWNSTREAM P2P BRIDGE 16-3 | 2 | 6 | 6 | 0xE7000000 | 0xE7FFFFFF |

FIG. 14
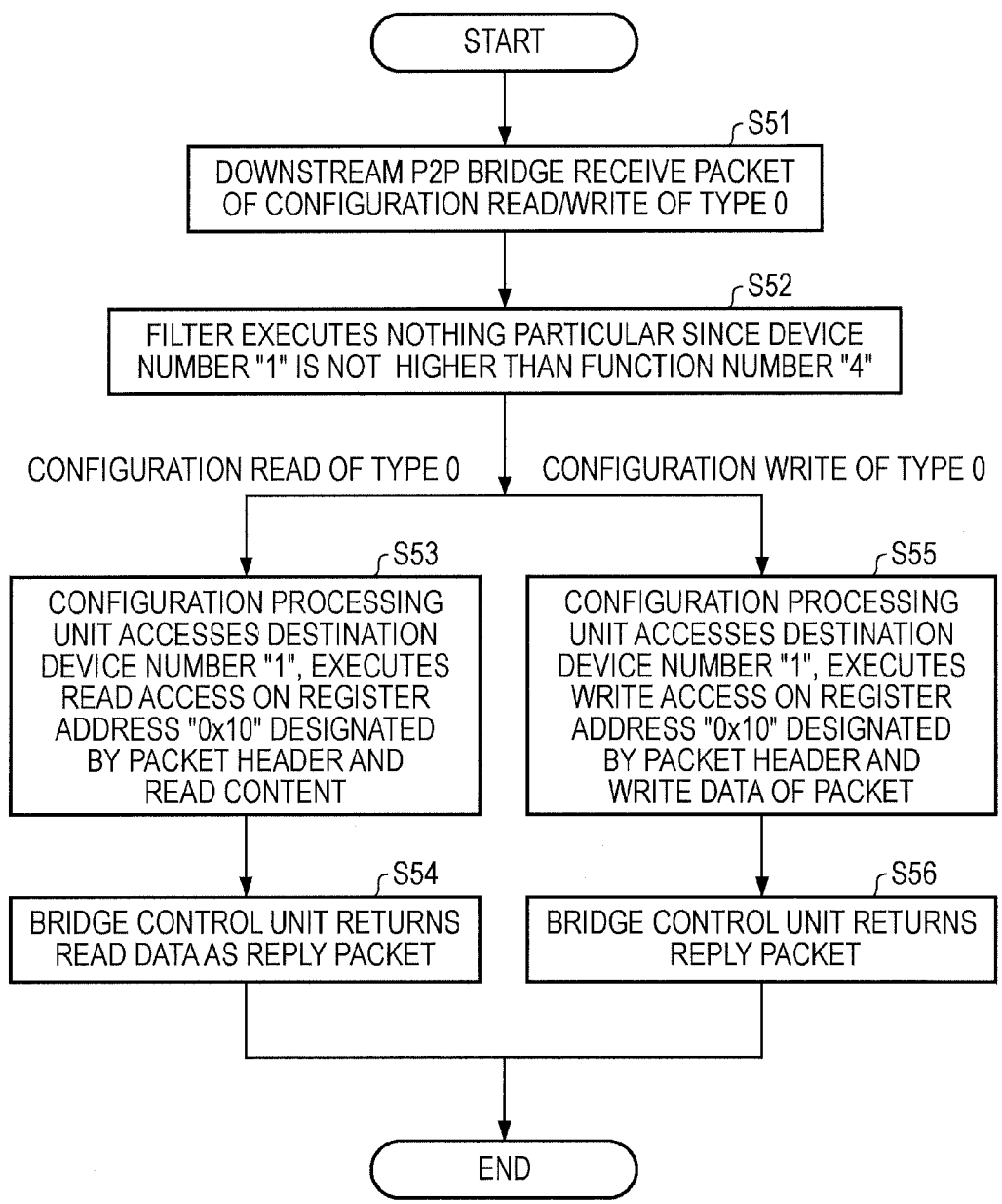

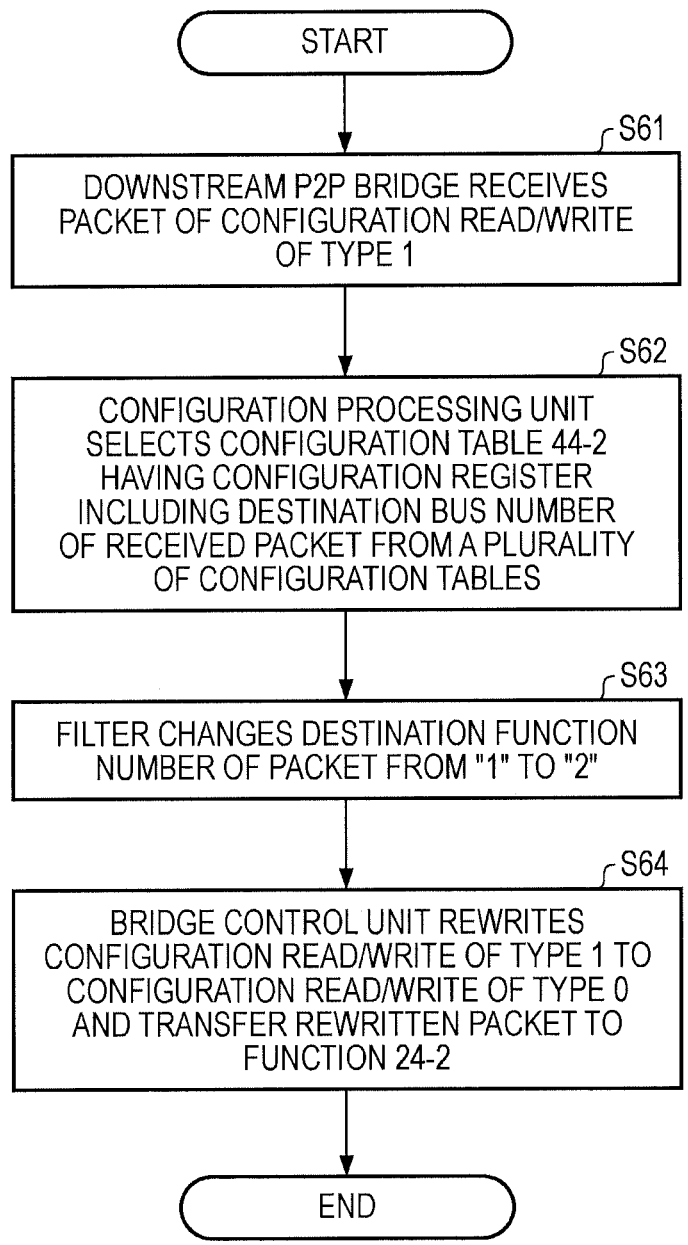
FIG. 15

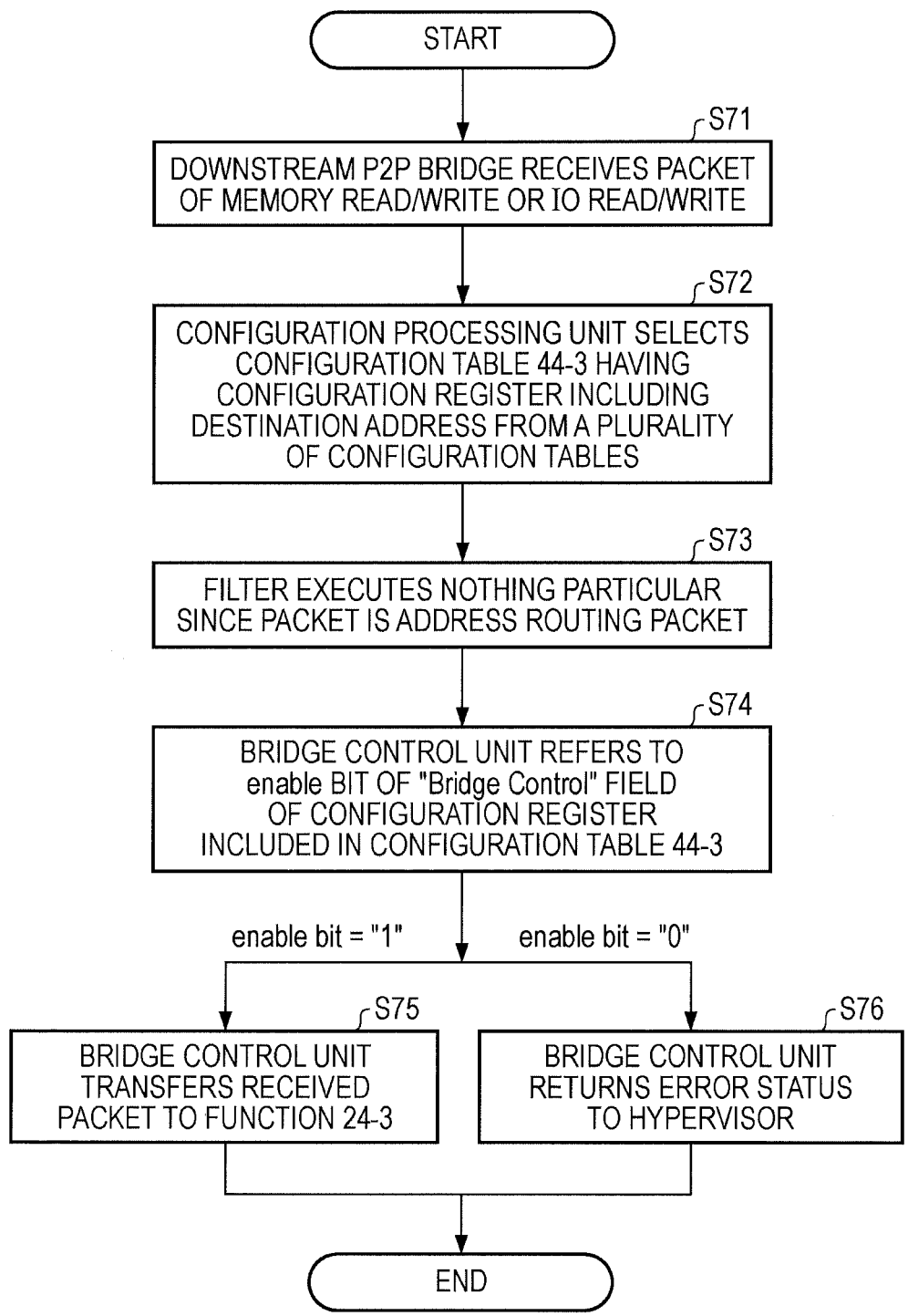
FIG. 16

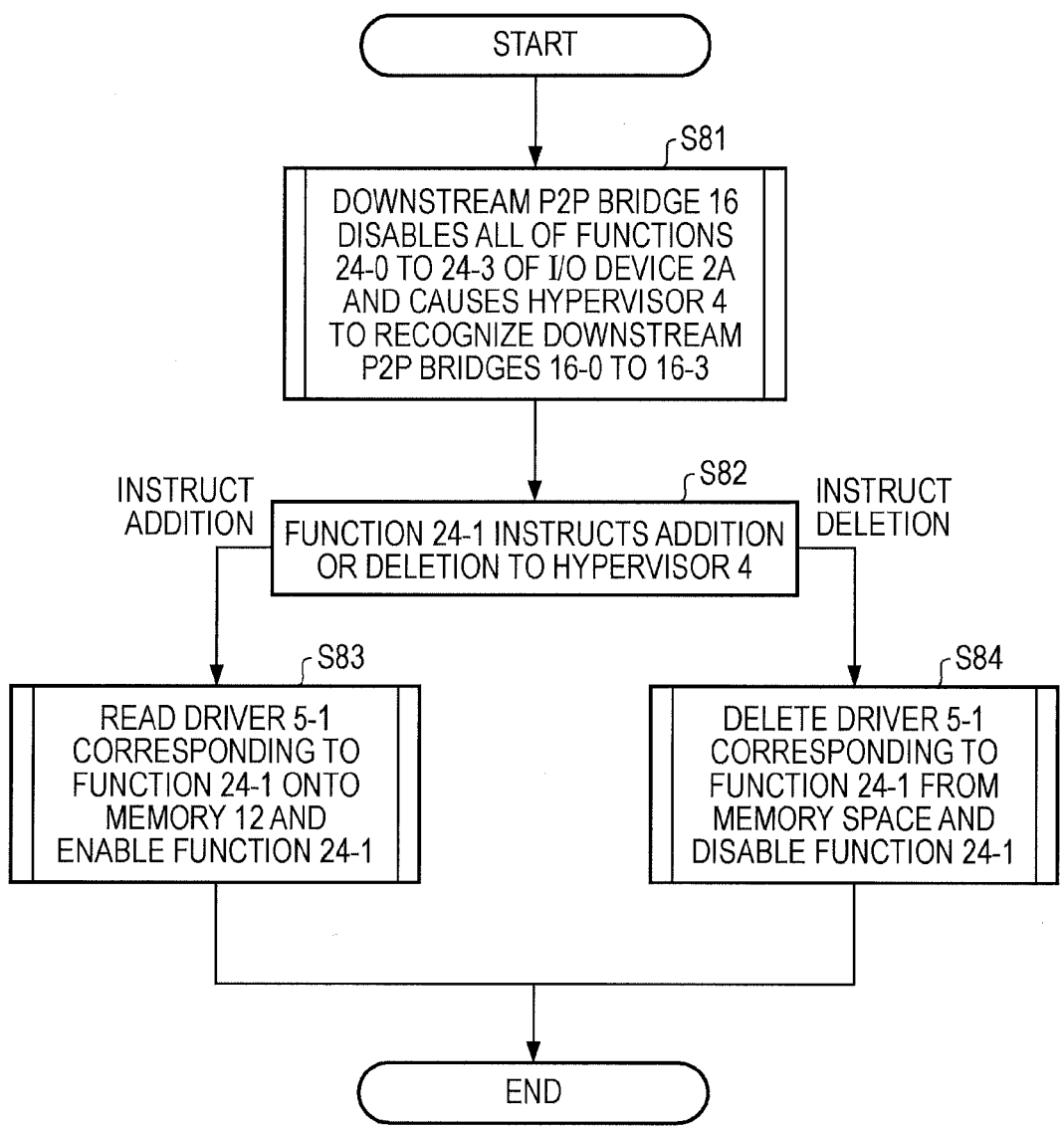
FIG. 17

FIG. 18
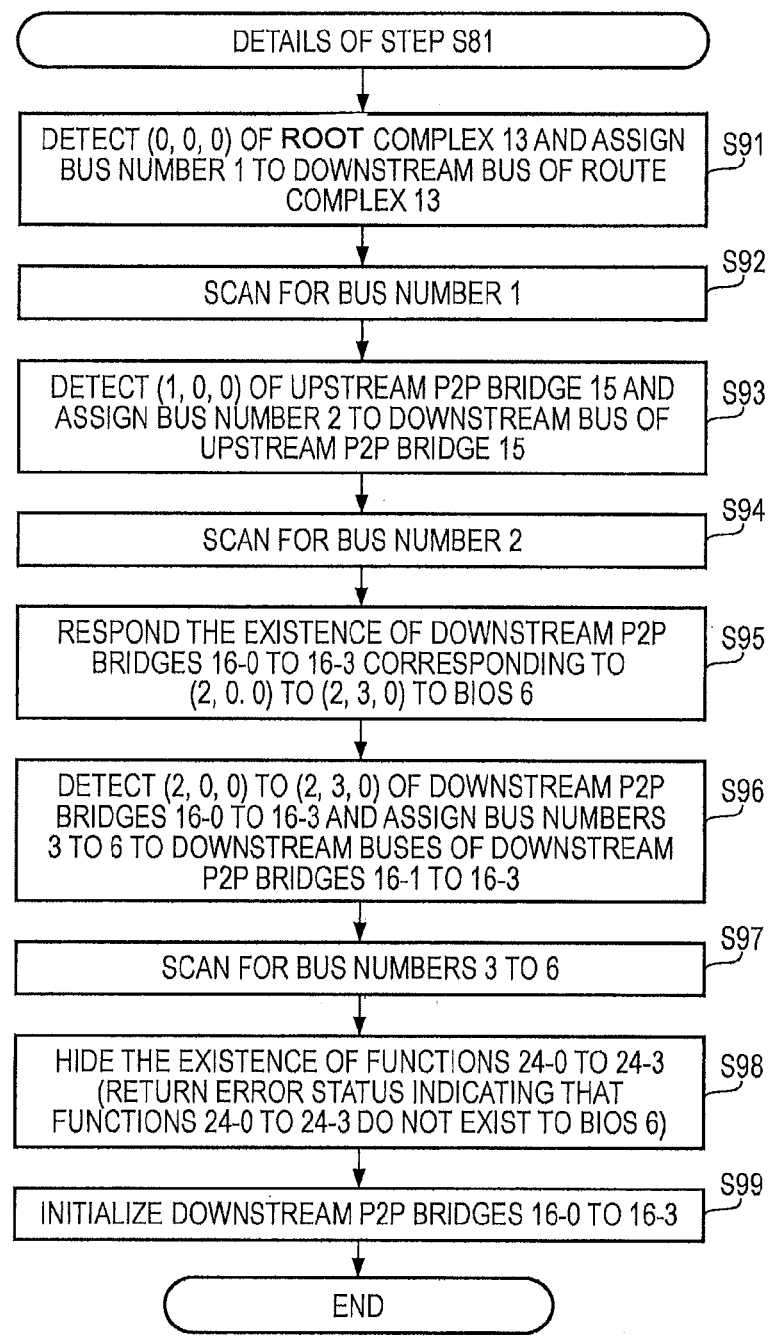

FIG. 19
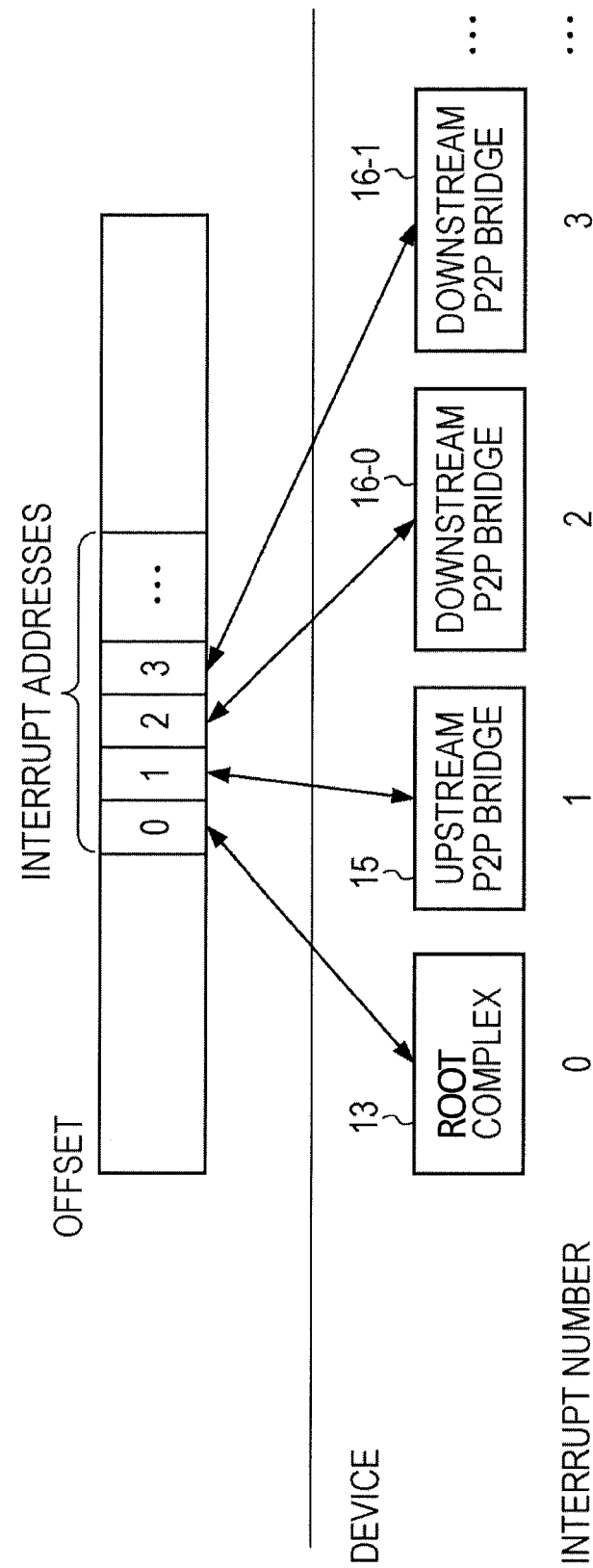

FIG. 20
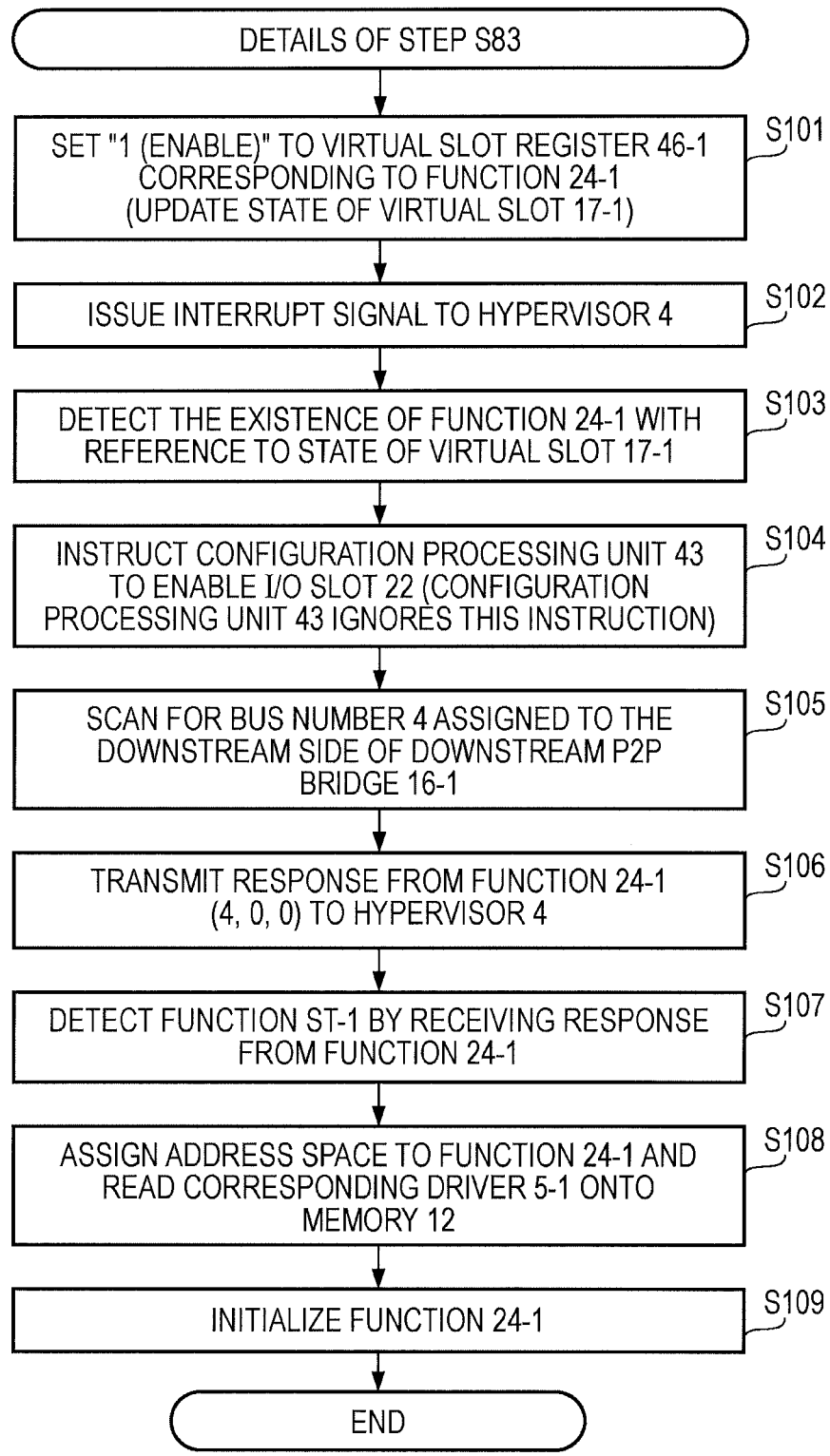

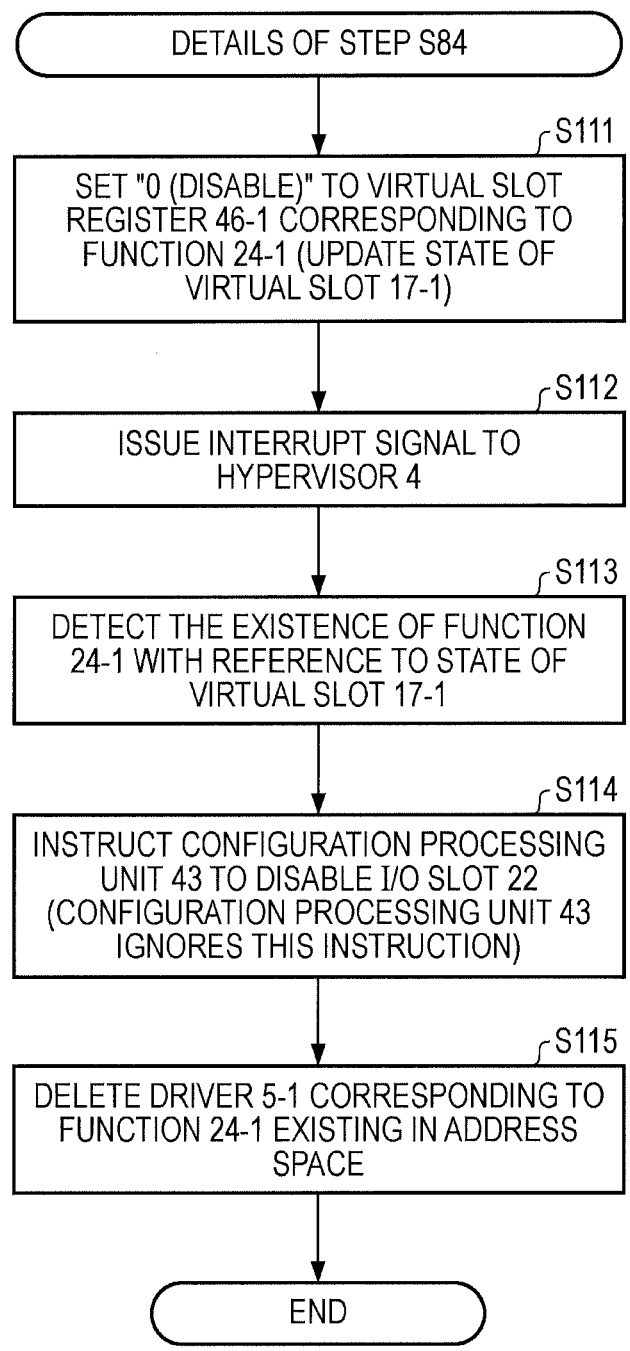
FIG. 21

SWITCHING CIRCUIT CONNECTED TO AN I/O DEVICE, AND SWITCHING CIRCUIT CONNECTED TO AN I/O DEVICE CONTROL METHOD

CROSS REFERENCE TO RELATED APPLICATION

This application is based upon and claims the benefit of priority from the prior Japanese Patent Application NO. 2010-176593 filed on Aug. 5, 2010, the entire contents of which are incorporated herein by reference.

FIELD

The embodiments discussed herein are related to switching circuits, information processing apparatuses, and switching circuit control methods.

BACKGROUND

Hitherto, for PCI buses with I/O slots or standard I/O buses such as a PCI Express (PCIe), a hot plug has been standardized which allows online insertion and removal of an I/O device (such as a network interface card (NIC)). A hot plug in the past is provided for an I/O slot. When an I/O device is inserted or removed online to or from an I/O slot, a hot plug controller issues an interrupt to an OS. The OS refers to the state of the hot plug controller and determines whether the I/O device has been inserted to the I/O slot or removed from the I/O slot. In accordance with the determination result, the OS enables or disables the corresponding device driver.

FIG. 1 is a schematic configuration diagram of a server and an I/O device. Referring to FIG. 1, a server 100 includes a CPU (Central Processing Unit) 111, a memory 112, a root complex 113, a PCI Express switch (hereinafter, called a PCIe switch) 114 and I/O slots 120 and 121. The memory 112 stores control programs for implementing a virtual machine, including a hypervisor 104, and a BIOS (Basic Input/Output System) 106. The hypervisor 104 may control one or more virtual machines (sometimes called VMs). The hypervisor 104 includes drivers 105A to 105C which control functions 122-0 to 122-3 and 123-0, which will be described below. The CPU 111 executes the hypervisor 104 within the memory 112 to implement virtual machines (VMs) 101, 102, and 103. The CPU 111 reads and executes the BIOS 106 stored in the memory 112. The root complex 113 is a core device of a PCIe system and internally contains a host bridge and is connected to the CPU 111. The PCIe switch 114 is a device for increasing the number of I/O slots to be connected to I/O devices. The I/O slots 120 and 121 are mechanisms for connecting the I/O devices 122 and 123, respectively.

The PCIe switch 114 includes an upstream PCI-to-PCI bridge (hereinafter, called a P2P bridge) 115, and downstream P2P bridges 116 and 118. The CPU 111 side will be called an upstream, and the side having the I/O devices 122 and 123 will be called a downstream. The upstream P2P bridge 115 and downstream P2P bridges 116 and 118 connect an upstream bus (or primary bus), not illustrated, and a downstream bus (or secondary bus), not illustrated, and transfer packets between the two buses. The downstream P2P bridges 116 and 118 include hot plug controllers 117 and 119, respectively. The hot plug controllers 117 and 119 detect the I/O device to be inserted or removed online to or from the I/O slots and use an interrupt signal to notify the hypervisor 104 of the insertion or removal of the I/O device.

The I/O device 122 includes a plurality of functions 122-0 and 122-1. The I/O device 123 also includes a function 123-0. In a PCIe system, the I/O devices 122 and 123 positioned at the most downstream parts may sometimes be called end points. Each of the functions 122-0 and 122-1 is a unit which provides a set of functions within the I/O device 122 to the hypervisor 104 or BIOS 106. The characteristic that a plurality of functions are provided within one I/O device is called multifunction. For example, when the I/O device 122 is a dual port NIC having two ports, the I/O device 122 has two functions. The hypervisor 104 may assign a function to be used to a virtual machine. For example, the hypervisor 104 assigns the function 122-0 to a virtual machine 101 and assigns the function 122-1 to the virtual machine 102.

Under the PCIe standard, the BIOS 106 when the server 100 is started assigns a set of a bus number, a device number and a function number to the functions within the root complex 113, upstream P2P bridge 115, downstream P2P bridges 116 and 118, and I/O devices 122 and 123. For example, the BIOS 106, as in the logically connected state illustrated in FIG. 2, sets a set of a bus number, a device number and a function number to the functions within the root complex 113, upstream P2P bridge 115, downstream P2P bridge 116 and I/O device 122. FIG. 3 is a block diagram illustrating a configuration of the PCIe switch 114.

The PCIe switch 114 includes the upstream P2P bridge 115, downstream P2P bridges 116 and 118, upstream port 130, switch 131, and downstream ports 132 and 133. Notably, the downstream port 132 corresponds to the I/O slot 120 in FIG. 1, and the downstream port 133 corresponds to the I/O slot 121 in FIG. 1.

The upstream port 130 provides a physical link for connecting to the root complex 113 in FIG. 1. The downstream ports 132 and 133 provide physical links for connecting to the I/O devices 122 and 123, respectively, in FIG. 1. The upstream P2P bridge 115 has a configuration table 115A and uses the configuration table 115A to control the transfer of a packet received from the hypervisor 104 or I/O devices 122 and 123. The switch 131 changes the internal destination (which may be the downstream P2P bridge 116 or 118) of a packet.

The downstream P2P bridge 116 includes a bridge control unit 142, a configuration processing unit 143 and a configuration table 144. The bridge control unit 142 refers to the configuration table 144 to control the packet transfer. The configuration table 144 stores information to be referred or set as a configuration space by the hypervisor 104 or BIOS 106. The configuration table 144 stores information on the state of the I/O slot 120 including whether the I/O device 122 has been connected or not. The configuration table 144 stores information for providing a function of the hot plug controller 117 in FIG. 1. The configuration processing unit 143 has a function of the hot plug controller 117.

Next, there will be described an operation by the server 100 when the I/O device 122 is connected to the server 100 and an operation by the server 100 when the I/O device 122 is removed from the server 100. FIG. 4A is a flowchart illustrating operations by the server 100 when the I/O device 122 is connected to the server 100. FIG. 4B is a flowchart illustrating operations by the server 100 when the I/O device 122 is removed from the server 100.

Referring to FIG. 4A, a circuit (not illustrated) on the I/O slot 120 detects the existence of the I/O device 122 and notifies the existence of the I/O device 122 to the hot plug controller 117 (step S201). The hot plug controller 117 updates the information on the state of the I/O slot 120 within the configuration table 144 with the information describing that the I/O device 122 has been connected (step S202). After that, the hot plug controller 117 issues an interrupt signal to the hypervisor 104 (step S203).

The hypervisor 104 refers to the updated information on the state of the I/O slot 120 within the configuration table 144 and detects the existence of the I/O device 122 (step S204). The hypervisor 104 instructs the hot plug controller 117 to enable the I/O slot 120 (step S205). More specifically, the hypervisor 104 rewrites a flag indicating power supply from the I/O slot 120 to the I/O device 122 within the configuration table 144 to "enable". Thus, the I/O slot 120 supplies power to the I/O device 122.

Next, the hypervisor 104 scans for the bus corresponding to the I/O slot 120 and detects the functions 122-0 and 122-1 within the I/O device 122 (step S206). More specifically, the hypervisor 104 scans the bus number corresponding to the I/O slot 120 downstream of the downstream P2P bridge 116 illustrated in the logically connected state in FIG. 2. Since the bus number corresponding to the I/O slot 120 downstream of the downstream P2P bridge 116 is "3" which is given to the functions, the hypervisor 104 scans for the bus number "3". Here, under the PCIe standard, one of the device numbers "0 to 31" is assigned to a device, and one of the function numbers "0 to 7" is assigned to a device. The hypervisor 104 therefore attempts access 256 times (=32×8 times) for the bus number "3". In the example in FIG. 2, the hypervisor 104 receives responses from the functions 122-0 and 122-1 (or (bus number, device number, function number)=(3,0,0), (3,0,1)) and detects the functions 122-0 and 122-1. On the other hand, the hypervisor 104 receives an error status from the I/O device 122 as a response to an access attempt excluding access to those functions.

The hypervisor 104 assigns address spaces of the hypervisor 104 to the functions 122-0 and 122-1 and reads the corresponding drivers 105A and 105B onto the memory 112 (step S207). The drivers 105A and 105B initialize the functions 122-0 and 122-1 (step S208). The operation by the server 100 ends.

Referring to FIG. 4B, a circuit (not illustrated) on the I/O slot 120 detects the removal of the I/O device 122 and notifies the removal of the I/O device 122 to the hot plug controller 117 (step S211). The hot plug controller 117 updates information on the state of the I/O slot 120 within the configuration table 144 with the information describing that the I/O device 122 has been removed (step S212). After that, the hot plug controller 117 issues an interrupt signal to the hypervisor 104 (step S213).

The hypervisor 104 refers to the update information on the state of the I/O slot 120 within the configuration table 144 and detects the removal of the I/O device 122 (step S204). The hypervisor 104 instructs the hot plug controller 117 to disable the I/O slot 120 (step S215). More specifically, the hypervisor 104 rewrites a flag indicating power supply from the I/O slot 120 to the I/O device 122 within the configuration table 144 to "disable". Thus, the I/O slot 120 no longer supplies power to the I/O device 122. After that, the hypervisor 104 deletes the drivers 105A and 105B corresponding to the functions 122-0 and 122-1 present on the memory 112 (step S216). The operation by the server 100 ends.

In this way, when the I/O device 122 is connected to the server 100, the hypervisor 104 instructs the hot plug controller 117 to enable the I/O slot 120, and power is supplied to the I/O device 122. As the result, the functions 122-0 and 122-1 within the I/O device 122 are collectively enabled. When the I/O device 122 is removed from the server 100, the hypervisor 104 instructs the hot plug controller 117 to disable the I/O slot 120. The power to be supplied to the I/O device 122 is blocked. As the result, the functions 122-0 and 122-1 within the I/O device 122 are collectively disabled.

Hitherto, a computer system has been known which includes a plurality of virtual computers constructed by a control program provided in a computer and having independent OSs (Operating Systems) running thereon and an I/O device having a single port which is connected to a PCI (Peripheral Component Interconnect) bus of the computer. Another technology has been known in which one set of functions is constructed from an arbitrary combination of a plurality of PCI agents and the functions are controlled from a BIOS (Basic Input/Output System) and/or a driver as one unit.

Japanese Laid-open Patent Publication Nos. 2004-252591 and 9-237246 are examples of related art.

In the server 100, the functions 122-0 and 122-1 within the I/O device 122 are collectively enabled or disabled. It may be difficult for the hypervisor 104 to enable a function within the I/O device 122 independently even when a manager requests to enable the function 122-0 only for assigning the function 122-0 to the virtual machine 101, for example.

SUMMARY

According to one aspect of the embodiments, there is provided a switching circuit connected to an I/O device having a plurality of functions, the switching circuit including a processing unit and a filter, wherein the processing unit includes at least the equal number of tables having bus numbers of destinations of packets to the number of the functions and if receives a packet which instructs to add a function to the I/O device, selects a table including a bus number of the destination of the packet from the plurality of tables and notifies the number of the selected table to the filter, and the filter changes the function number of the destination of the packet to the notified number of the table.

BRIEF DESCRIPTION OF DRAWINGS

FIG. 1 is a schematic configuration diagram of a server and an I/O device;

FIG. 2 illustrates examples of a physically connected state and logically connected state between the server and I/O device;

FIG. 3 is a block diagram illustrating a configuration of a PCIe switch;

FIG. 4A is a flowchart illustrating an operation by the server when the I/O device is connected to the server, and FIG. 4B is a flowchart illustrating an operation by the server when the I/O device is removed from the server;

FIG. 5 is a schematic configuration diagram of a server and I/O devices according to an embodiment;

FIG. 6 is a block diagram illustrating a configuration of a PCIe switch;

FIG. 7A illustrates the structure of a packet to be transferred between a hypervisor and the I/O device, FIG. 7B illustrates a part of data contained in a header area, and FIG. 7C illustrates a relationship between a packet type and data included in "Fmt" and "Type" in a header area;

FIG. 8A illustrates an example of the header of an address routing packet, and FIG. 8B illustrates an example of the header of a ID routing packet;

FIG. 9 illustrates a schematic data structure of a configuration register included in a configuration table;

FIG. 10 is a flowchart illustrating processing to be executed in a configuration processing unit;

FIG. 11 is a flowchart illustrating processing to be executed in a filter;

FIG. 12 illustrates examples of a physically connected state and logically connected state between a server and an I/O device;

FIG. 13 illustrates partial details of a configuration table for a P2P bridge included in the server;

FIG. 14 is a flowchart illustrating an example of a transfer operation on a packet by the server when a type 0 configuration read (CfgRd0) or configuration write (CfgWr0) packet is issued;

FIG. 15 is a flowchart illustrating an example of a packet transfer operation by the server when a type 1 configuration read (CfgRd1) or configuration write (CfgWr1) packet is issued;

FIG. 16 is a flowchart illustrating an example of a packet transfer operation by the server when the memory read (MRd) or memory write (MWr) or IO read (IORd) or IO write (IOWr) packet is issued;

FIG. 17 is a flowchart illustrating an operation by the entire system when function addition or delete is instructed;

FIG. 18 is a flowchart illustrating details of step S81 in FIG. 17;

FIG. 19 illustrates a relationship between a memory space of the hypervisor and interrupt numbers of devices;

FIG. 20 is a flowchart illustrating details of step S83 in FIG. 17; and

FIG. 21 is a flowchart illustrating details of step S84 in FIG. 17.

DESCRIPTION OF EMBODIMENTS

With reference to drawings, an embodiment of the present invention will be described below. FIG. 5 is a schematic logical configuration diagram of a server and I/O devices.

Referring to FIG. 5, a server 1 (information processing apparatus) includes a CPU (Central Processing Unit) 11, a memory 12, a root complex 13, and a PCI Express switch (hereinafter, called a PCIe switch) 14 (switching circuit). The server 1 further includes an input unit 7 by which a manager or user may input information to a downstream PCI-to-PCI bridge, which will be described below. The memory 12 includes a hypervisor 4 which is a control program for implementing a virtual machine, drivers 5-0 to 5-N (N: natural number) which controls functions, and a BIOS (Basic Input/Output System) 6. The hypervisor 4 operates an OS (Operating System) on a virtual machine. The CPU 11 executes the hypervisor 4 on the memory 12 to implement virtual machines (VMs) 3-0 to 3-N (N: natural number).

The hypervisor 4 may assign a function to be used to a virtual machine. For example, the hypervisor 4 assigns a function 24-0 to the virtual machine 3-0 and a function 24-1 to the virtual machine 3-1. The CPU 11 reads and executes the BIOS 6 stored in the memory 12. The root complex 13 is a core device of the PCIe system and internally contains a host bridge and is connected to the CPU 11. The PCIe switch 14 is a device for increasing the number of I/O slots to which I/O devices are to be connected.

The PCIe switch 14 includes an upstream PCI-to-PCI bridge (hereinafter, called a P2P bridge) 15, downstream P2P bridges 16-0 to 16-3, downstream P2P bridges 19-0 to 19-N (N: natural number equal to or higher than 1) and I/O slots 22 and 23. The I/O slots 22 and 23 are devices to which I/O devices 2A and 2B are to be connected. According to this embodiment, the CPU 11 side is upstream, and the side having the I/O devices 2A and 2B is downstream.

The upstream P2P bridge 15, downstream P2P bridges 16-0 to 16-3 and downstream P2P bridges 19-0 to 19-N connect an upstream bus (or primary bus), not illustrated, and a downstream bus (or secondary bus), not illustrated, and transfer a packet which is transfer data between the two buses. The downstream P2P bridges 16-0 to 16-3 include hot plug controllers 17-0 to 17-3 and virtual slots 18-0 to 18-3, respectively.

The downstream P2P bridges 19-0 to 19-N include hot plug controllers 20-0 to 20-N (N: a natural number equal to or higher than 1) and virtual slots 21-0 to 21-N (N: a natural number equal to or higher than 1), respectively. Each of the virtual slots is a virtual slot for connecting a function within an I/O device to a downstream P2P bridge. Each of the hot plug controllers detects a function to be inserted or removed to or from a virtual slot and may notify the hypervisor 4 of the fact that a function has been inserted or removed by using an interrupt signal.

An I/O device 2A includes a plurality of functions 24-0 to 24-3. An I/O device 2B also includes a plurality of functions, not illustrated. In a PCIe system, the I/O devices 2A and 2B positioned at the most downstream part may sometimes be called end points.

Each of the functions 24-0 to 24-3 provides a set of functions within the I/O device 2A to the hypervisor 4 (OS) or BIOS 6. One function is assigned an independent configuration table. The characteristic that a plurality of functions are provided within one I/O device is called multifunction. For example, if the I/O device 2A is a dual port NIC having two ports, the dual I/O device 122 has one function for each port.

Under the PCIe standard, the BIOS 6 when the server 1 is started assigns a set of a bus number, a device number and a function number to the functions within the root complex 13, upstream P2P bridge 15, downstream P2P bridges 16-0 to 16-3 and 19-0 to 19-N and I/O devices 2A and 2B. For example, the BIOS 6 assigns a set of a bus number, a device number and a function number to the functions 24-0 to 24-3 within the root complex 13, upstream P2P bridge 15, downstream P2P bridges 16-0 to 16-3 and I/O device 2A, as in the logically connected state illustrated in FIG. 12 which will be described below.

According to this embodiment, as illustrated in FIG. 5, the downstream P2P bridges 16-0 to 16-3 corresponding to one physical slot, that is, the I/O slot 22, have the equal number of hot plug controllers 17-0 to 17-3 and virtual slots 18-0 to 18-3 to the number of functions of the I/O device 2A. The downstream P2P bridges 16-0 to 16-3 connect the virtual slots 18-0 to 18-3 to the functions 24-0 to 24-3 within the I/O device 2A in one-to-one manner. The hot plug controllers 17-0 to 17-3 notify the hypervisor 4 of the fact that a function has been inserted or removed by using an interrupt signal.

FIG. 6 is a block diagram illustrating a configuration of the PCIe switch 14.

The PCIe switch 14 includes an upstream P2P bridge 15, a downstream P2P bridge 16, a downstream P2P bridge 19, an upstream port 30, a switch 31, and downstream ports 32 and 33. The downstream P2P bridge 16 corresponds to the downstream P2P bridges 16-0 to 16-3 in FIG. 5, and the downstream P2P bridge 19 corresponds to the downstream P2P bridges 19-0 to 19-N in FIG. 5. The downstream port 32 corresponds to the I/O slot 22 in FIG. 5, and the downstream port 33 corresponds to the I/O slot 23 in FIG. 5.

The upstream port 30 provides a physical link for connecting to the root complex 13 in FIG. 5. The downstream ports 32 and 33 provide physical links for connecting to the I/O devices 2A and 2B, respectively, in FIG. 5. The upstream P2P bridge 15 has a configuration table 15A and uses the configuration table 15A to control the transfer of a packet received from the OS or I/O devices 2A and 2B. The switch 31 changes the internal destination (or downstream P2P bridge 16 or 19) of a packet.

The downstream P2P bridge 16 has a filter 41 which is an example of changing means, a bridge control unit 42 which is an example of control means, a configuration processing unit 43 which is an example of selecting means, and configuration tables 44-0 to 44-3. The number of configuration tables that the downstream P2P bridge 16 has is equal to the number of functions included in the I/O device 2A. The configuration tables 44-0 to 44-3 include configuration registers 45-0 to 45-3, virtual slot registers 46-0 to 46-3, and hot plug controller registers 47-0 to 47-3, respectively. The virtual slot registers 46-0 to 46-3 are registers indicating the states of virtual slots and include registers which indicate the enable/disable of the virtual slots with "1" and "0". The virtual slot registers 46-0 to 46-3 correspond to the virtual slots 18-0 to 18-3 in FIG. 5. The hot plug controller registers 47-0 to 47-3 are registers to be used for providing functions of the hot plug controllers 17-0 to 17-3 in FIG. 5 to the configuration processing unit 43.

In order to provide virtual slots to the hypervisor 4 and I/O device 2A without conflicts, the filter 41 rewrites a packet transmitted from the hypervisor 4 and a packet transmitted from the I/O device 2A. If a packet transmitted from the hypervisor 4 is a packet off a support range, the filter 41 returns the packet with an "Unsupported" status to the hypervisor 4 to control PCIe access from the hypervisor 4.

The bridge control unit 42 refers to the configuration tables 44-0 to 44-3 to control the transfer of a packet. The configuration table to be referred is determined by the configuration processing unit 43.

The configuration processing unit 43 determines the destination function within the I/O device 2A of a packet. The configuration processing unit 43 reads the configuration register 45 and virtual slot register 46 from the configuration table corresponding to the determination result and transfers them to the bridge control unit 42. This establishes connection between the functions and the virtual slots in one-to-one manner.

Because the downstream P2P bridge 19 fundamentally has the same configuration as that of the downstream P2P bridge 16, the description will be omitted. The equal number of virtual slots to the number of functions included in the I/O device 2A are assigned to the configuration tables 44-0 to 44-3. For that, the hypervisor 4 appears to virtually have the equal number of ports to the number of configuration tables 44-0 to 44-3, and the virtual ports appear to have physical I/O slots.

Next, a packet to be transferred between the hypervisor 4 and the I/O device 2A will be described.

FIG. 7A illustrates the structure of a packet to be transferred between the hypervisor 4 and the I/O device 2A. The packet is called TLP (Transaction Layer Packet) under the PCIe standard and is used for data transmission and reception. The packet includes a header and a data area, as illustrated in FIG. 7A. The "+0" to "+3" at the top row in FIG. 7A indicate the number of bytes, and "0" to "7" indicate bit counts.

FIG. 7B illustrates a part of data contained in a header area provided under the PCIe standard. The data contained in the "Fmt" and "Type" in the header area designates a packet type. The packet types may include memory read, memory write, IO read, IO write, (type 0, type 1) configuration read, and (type 0, type 1) configuration write and are predetermined under the PCIe standard, as illustrated in FIG. 7C.

A memory read packet is written as "MRd" in FIG. 7C and may be output by the hypervisor 4 when data is read from memory which is a function included in the I/O device 2A, for example. A memory write packet is written as "MWr" in FIG. 7C and may be output by the hypervisor 4 when data is written to memory which is a function included in the I/O device 2A, for example. An IO read packet is written as "IORd" in FIG. 7C and may be output by the hypervisor 4 when data is read from an I/O interface (such as a network communication port) which is a function included in the I/O device 2A, for example. An JO write packet is written as "IOWr" in FIG. 7C and may be output by the hypervisor 4 when data is written to an I/O interface which is a function included in the I/O device 2A, for example.

A (type 0) configuration read packet is written as "CfgRd0" in FIG. 7C and may be output by the hypervisor 4 when data is read from a configuration table included in the downstream P2P bridge 16 or 19. A (type 0) configuration write packet is written as "CfgWr0" in FIG. 7C and may be output by the hypervisor 4 when data is written to a configuration table included in the downstream P2P bridge 16 or 19.

A (type 1) configuration read packet is written as "CfgRd1" in FIG. 7C and may be output by the hypervisor 4 when the hypervisor 4 reads data from a configuration space for a device (which is the I/O devices 2A and 2B, here) connected to the PCI bus downstream of the downstream P2P bridge 16 or 19, for example. A (type 1) configuration write packet is written as "CfgWr1" in FIG. 7C and may be output by the hypervisor 4 when the hypervisor 4 writes data to a configuration space for a device (which is the I/O devices 2A and 2B, here) connected to the PCI bus downstream of the downstream P2P bridge 16 or 19, for example.

The memory read, memory write, IO read and IO write packets are transferred by address routing. The address routing refers to a method by which the destination of a packet is designated with an address. In the address routing, the PCIe switch 14 transfers a packet to the downstream P2P bridge having the I/O device corresponding to the destination address thereunder. FIG. 8A illustrates an example of the header of a packet in the address routing. In an address routing packet, "Requester ID" in FIG. 8A designates the ID of the source of the packet, and "Address" in FIG. 8A designates the address of the destination.

The (type 0, type 1) configuration read and (type 0, type 1) configuration write packets are transferred by ID routing. The ID routing refers to a method by which a destination is designated with a set of a bus number, a device number and a function number. In the ID routing, the PCIe switch 14 transfers a packet to the downstream P2P bridge having the bus number of the destination thereunder. FIG. 8B illustrates an example of the header of a packet in the ID routing. In an ID routing packet, "Requester ID" in FIG. 8B designates the ID of the source of the packet, and "Bus Number", "Device Number" and "Function Number" in FIG. 8B designate the ID of the destination.

FIG. 9 illustrates a schematic data structure of a configuration register 45-0 included in the configuration table 44-0. The data structures of the configuration registers 45-1 to 45-3 are the same as the data structure of the configuration register 45-0. Because the fields (such as "Device ID" and "Vendor ID") of the configuration register 45-0 are predetermined under the PCIe standard, the description will be omitted.

The bridge control unit 42 refers to a schematic data structure of one of the configuration registers 45-0 to 45-3 to control the packet transfer. The configuration register to be referred is determined by the configuration processing unit 43. For example, if a memory read or memory write packet is received from the hypervisor 4 and if the address of the destination included in the header of the packet exists within the range of the addresses designated by "Memory Base" and "Memory Limit" in FIG. 9, the bridge control unit 42 transfers the received packet to the downstream I/O device 2A. If an IO read or IO write packet is received from the hypervisor 4 and if the address of the destination included in the header of the packet exists within the range of addresses designated by "I/O Base" and "I/O Limit" in FIG. 9, the bridge control unit 42 transfers the received packet to the downstream IO device 2A. If an ID routing packet (such as a (type 0, type 1) configuration read or (type 0, type 1) configuration write packet) is received from the hypervisor 4 and if the address of the destination included in the header of the packet exists within the range of bus numbers designated by "Secondary Bus Number" and "Subordinate Bus Number" in FIG. 9, the bridge control unit 42 transfers the received packet to the downstream I/O device 2A. The bridge control unit 42 transfers the packet received from the downstream I/O device 2A to the hypervisor 4.

FIG. 10 is a flowchart illustrating processing to be executed in the configuration processing unit 43. Here, index numbers 0 to 3 are given to the configuration tables 44-0 to 44-3 in order, and the index numbers 0 to 3 correspond to the function numbers in one-to-one manner.

First of all, the configuration processing unit 43 determines whether the received packet is a packet from the upstream hypervisor 4 or not (step S1). If the received packet is a packet from the upstream hypervisor 4 (YES in step S1), the configuration processing unit 43 determines whether the received packet is a packet for the configuration read or configuration write of type 0 or not (step S2). If the received packet is a type 0 configuration read or configuration write packet (YES in step S2), the configuration processing unit 43 selects the configuration table 44 corresponding to the device number of the destination included in the header of the received packet (step S3). The configuration processing unit 43 performs data read or write on the selected configuration table 44 (step S4). After that, the processing ends.

If the received packet is not a type 0 configuration read or configuration write packet (NO in step S2) on the other hand, the configuration processing unit 43 determines whether the received packet is a type 1 configuration read or configuration write packet or not (step S5). If the received packet is not a type 1 configuration read or configuration write packet (NO in step S5), the configuration processing unit 43 determines whether the received packet is an address routing packet or not (step S6). If the received packet is an address routing packet (YES in step S6), the configuration processing unit 43 selects from the configuration tables 44-0 to 44-3, a configuration table having the configuration register 45 including the address of the destination of the received packet (step S7).

If the received packet is a type 1 configuration read or configuration write packet (YES in step S5) on the other hand, the configuration processing unit 43 selects from the configuration tables 44-0 to 44-3 the configuration table having the configuration register 45 including the bus number of the destination of the received packet (step S8). If the received packet is not an address routing packet (NO in step S6), the configuration processing unit 43 selects from the configuration tables 44-0 to 44-3 the configuration table having the configuration register 45 including the bus number of the destination of the received packet (step S8).

If the received packet is not a packet from the upstream hypervisor 4, that is, if it is a packet from the downstream IO device 2A (NO in step S1), the configuration table corresponding to the function number of the source included in the header of the received packet is selected (step S9).

After the processing in steps S7 to S9, the configuration processing unit 43 notifies the number of the selected configuration table to the filter 41 (step S10). The configuration processing unit 43 then designates the selected configuration table to the context of the bridge and notifies the designated configuration table number to the bridge control unit 42 (step S11). The processing ends. The bridge control unit 42 controls the packet transfer on the basis of the configuration table corresponding to the notified number.

FIG. 11 is a flowchart illustrating processing to be executed in the filter 41. The index numbers 0 to 3 are also given to the configuration tables 44-0 to 44-3, and the index numbers 0 to 3 correspond to the function numbers in one-to-one manner.

The filter 41 determines whether the received packet is a packet from the upstream hypervisor 4 or not (step S21). If the received packet is a packet from the upstream hypervisor 4 (YES in step S21), the filter 41 determines whether the received packet is a type 0 configuration read or configuration write packet or not (step S22). If the received packet is a type 0 configuration read or configuration write packet (YES in step S22), the filter 41 determines whether the device number of the destination of the received packet is higher than the number of functions of the I/O device 2A or not (step S23).

If the device number of the destination of the received packet is higher than the number of functions of the I/O device 2A (YES in step S23), the filter 41 returns the received packet as having the "Unsupported" status to the hypervisor 4 (step S24), and the processing ends. If the device number of the destination of the received packet is not higher than the number of functions of the I/O device 2A (NO in step S23) on the other hand, the filter 41 performs nothing particular, and the processing ends. In this case, the filter 41 transfers the received packet to the bridge control unit 42.

If the received packet is not a type 0 configuration read or configuration write packet (NO in step S22), the filter 41 determines whether the received packet is a type 1 configuration read or configuration write packet or not (step S25).

If the received packet is a type 1 configuration read or configuration write packet (YES in step S25), the filter 41 determines whether the function number of the destination of the received packet is higher than 0 or not (step S26). If the function number of the destination of the received packet is higher than 0 (YES in step S26), the filter 41 performs the processing in step S24. On the other hand, if the function number of the destination of the received packet is not higher than 0, that is, if the function number of the destination of the received packet is equal to 0 (NO in step S26), the function number of the destination of the received packet is changed to the number of the configuration table notified from the configuration processing unit 43 (step S27), and the processing ends. Step S27 transfers the received packet from the virtual port connected to the destination function in one-to-one manner to the destination function.

If the received packet is not a type 1 configuration read or configuration write packet (NO in step S25), the filter 41 determines whether the received packet is an address routing packet or not (step S28). If the received packet is an address routing packet (YES in step S28), the filter 41 performs nothing particular, and the processing ends. In this case, the filter 41 transfers the received packet to the bridge control unit 42. On the other hand, if the received packet is not an address routing packet (NO in step S28), the filter 41 executes the processing in step S27.

If the received packet is not a packet from the upstream hypervisor 4, that is, if it is a packet from the downstream JO device 2A (NO in step S21), the filter 41 changes the function number of the source of the received packet to 0 (step S29). This is for causing the hypervisor 4 to recognize the received packet from the I/O device 2A.

Next, a more specific packet transfer operation will be described. The physically connected state and logically connected state of the server 1 and I/O device 2A as illustrated in FIG. 12 are assumed below. FIG. 13 illustrates partial details of a configuration table for a P2P bridge included in the server 1.

As illustrated in FIG. 12, it is assumed, for example, that the number of functions of the I/O devices 2A is four. Each of the devices included in the logical connection in FIG. 12 is assigned a set of a bus number, a device number, and a function number. The root complex 13 is assigned a set of bus number 0, device number 0, and function number 0. The upstream P2P bridge 15 is assigned a set of bus number 1, device number 0, and function number 0. The downstream P2P bridge 16-0 is assigned a set of bus number 2, device number 0, and function number 0. The downstream P2P bridge 16-1 is assigned a set of bus number 2, device number 1, and function number 0. The downstream P2P bridge 16-2 is assigned a set of bus number 2, device number 2, and function number 0. The downstream P2P bridge 16-3 is assigned a set of bus number 2, device number 3, and function number 0. The function 24-0 is assigned a set of bus number 3, device number 0, and function number 0. The function 24-1 is assigned a set of bus number 4, device number 0, and function number 0. The function 24-2 is assigned a set of bus number 5, device number 0, and function number 0. The function 24-3 is assigned a set of bus number 6, device number 0, and function number 0. The logical connection of the downstream P2P bridges 16-0 to 16-3 correspond to the configuration tables 44-0 to 44-3 included in the downstream P2P bridge 16 of the physical connection.

As illustrated in FIG. 13, a configuration table (more specifically, a configuration register) included in each P2P bridge has "Primary Bus Number" which is the bus number assigned to the P2P bridge and "Secondary Bus Number" which is a bus number of the device downstream of the P2P bridge. The configuration table included in each P2P bridge further has "Subordinate Bus Number" which is a maximum bus number among the bus numbers of the devices downstream of the P2P bridge. The configuration table included in each P2P bridge has information on a memory address space assigned to a downstream device designated with "Memory Base" and "Memory limit".

FIG. 14 is a flowchart illustrating an example of a transfer operation on a packet by the server 1 when a type 0 configuration read (CfgRd0) or configuration write (CfgWr0) packet is issued on the basis of the flowcharts in FIG. 10 and FIG. 11. It is assumed here that the hypervisor 4 operated by the CPU 11 has issued a type 0 configuration read or configuration write packet. It is further assumed that the destination of the header of the packet (bus number, device number, function number)=(2,1,0) and that the destination register address is "0x10". The destination register address corresponds to "Register Number" in the packet header in FIG. 8B.

First of all, the downstream P2P bridge 16 receives a packet for the type 0 configuration read or configuration write from the hypervisor 4 through the upstream P2P bridge 15 (step S51). Because the device number "1" of the destination of the received packet is not higher than the number of functions of the I/O device 2A is not higher than "4", the filter 41 performs nothing particular in accordance with step S23 in the flowchart in FIG. 11 (step S52). If the received packet is a type 0 configuration read packet, configuration processing unit 43 accesses the configuration table 44-1 corresponding to the device number "1" of the destination included in the header of the received packet in accordance with steps S3 and S4 in the flowchart in FIG. 10. The configuration processing unit 43 performs read access to the register address "0x10" designated by the header of the packet and reads the content (step S53). The bridge control unit 42 returns the read data as a reply packet to the hypervisor 4 (step S54), and the processing ends.

On the other hand, if the received packet is a type 0 configuration write packet, the configuration processing unit 43 accesses the configuration table 44-1 corresponding to the device number "1" of the destination included in the header of the received packet in accordance with the steps S3 and S4 in the flowchart in FIG. 10. The configuration processing unit 43 performs write access to the register address "0x10" designated by the header of the packet and writes the data in the packet (step S55). The bridge control unit 42 returns the reply packet (step S56), and the processing ends.

FIG. 15 is a flowchart illustrating an example of a packet transfer operation by the server 1 when a type 1 configuration read (CfgRd1) or configuration write (CfgWr1) packet is issued on the basis of the flowcharts in FIG. 10 and FIG. 11. It is assumed here that the hypervisor 4 which is operated by the CPU 11 has issued a type 1 configuration read or configuration write packet. It is further assumed that the destination of the header of the packet is (bus number, device number, function number)=(5,0,0) and that the destination register address is "0x10". The destination register address corresponds to "Register Number" of the packet header in FIG. 8B.

First of all, the downstream P2P bridge 16 receives a type 1 configuration read or configuration write packet from the hypervisor 4 through the upstream P2P bridge 15 (step S61). The configuration processing unit 43 learns from the content of the configuration table in FIG. 13 that the bus number "5" of the destination belongs to the downstream P2P bridge 16-2, that is, the configuration table 44-2. Thus, the configuration processing unit 43 selects from the configuration tables 44-0 to 44-3 the configuration table 44-2 having the configuration register 45-2 including the bus number of the destination of the received packet (step S62) in accordance with step S8 in the flowchart in FIG. 10. The filter 41 changes the function number of the destination of the received packet from "0" to "2" (step S63) in accordance with step S27 in the flowchart in FIG. 11. Thus, the destination of the packet is the function 24-2, that is, the function with the function number "2" in the I/O device 2A. The bridge control unit 42 rewrites the type of the received packet from the type 1 configuration read (CfgRd1) or configuration write (CfgWr1) to the type 0 configuration read (CfgRd0) or configuration write (CfgWr0). The bridge control unit 42 transfers the rewritten type 0 configuration read (CfgRd0) or configuration write (CfgWr0) packet to the function 24-2 (or the function with the function number "2" in the I/O device 2A) (step S64). The processing then ends.

FIG. 16 is a flowchart illustrating an example of a packet transfer operation by the server 1 when a memory read (MRd) or memory write (MWr) or IO read (IORd) or IO write (IOWr) packet is issued on the basis of the flowcharts in FIG. 10 and FIG. 11. It is assumed here that the hypervisor 4 operated by the CPU 11 has issued a memory read (MRd) or memory write (MWr) or IO read (IORd) or IO write (IOWr) packet. It is further assumed that the destination (Address) of the header of the packet is "0xe7081234".

First of all, the downstream P2P bridge 16 receives a memory read (MRd) or memory write (MWr) or IO read (IORd) or IO write (IOWr) packet from the hypervisor 4 through the upstream P2P bridge 15 (step S71). The configuration processing unit 43 learns from the content of the configuration table in FIG. 13 that the destination address "0xe7081234" belongs to the downstream P2P bridge 16-3, that is, the configuration table 44-3. Thus, the configuration processing unit 43 selects from the configuration tables 44-0 to 44-3 the configuration table 44-3 having the configuration register 45-3 including the address of the destination of the received packet (step S72) in accordance with step S7 in the flowchart in FIG. 10. Because the received packet is an address routing packet, the filter 41 performs nothing particular in accordance with step S28 in the flowchart in FIG. 11 (step S73). The bridge control unit 42 refers to the "Bridge Control" field in the configuration register 45-3 included in the configuration table 44-3 (step S74). If the enable bit indicating that the access relay to the function within the I/O device 2A included in the "Bridge Control" field is "1" indicating "enable", the bridge control unit 42 transfers the received packet to the function 24-3 (or the function with the function number "3" in the I/O device 2A) (step S75). The processing then ends. If the enable bit indicating that the access relay to the function within the I/O device 2A is "0" indicating "disable", the bridge control unit 42 returns an error status to the hypervisor 4 (step S76). The processing then ends.

FIG. 17 is a flowchart illustrating an operation by the entire system when function addition or delete is instructed. It is assumed that the I/O device 2A is connected to the server 1 and that power is supplied from the server 1 to the I/O device 2A.

First of all, the downstream P2P bridge 16 disables all of the functions 24-0 to 24-3 of the I/O device 2A and causes the hypervisor 4 to recognize the four downstream P2P bridges 16-0 to 16-3 (step S81). Next, a manager, a user or management software that operates on the hypervisor 4 instructs the hypervisor 4 to add or delete the function 24-1 (step S82). The instruction to add or delete the function 24-1 is input from external management software or the input unit 7, for example.

If instructed to add the function 24-1, the hypervisor 4 reads the driver 5-1 corresponding to the function 24-1 onto the memory 12 and enables the function 24-1 (step S83). On the other hand, if instructed to delete the function 24-1, the hypervisor 4 deletes the driver 5-1 corresponding to the function 24-1 from a memory space and disables the function 24-1 (step S84).

FIG. 18 is a flowchart illustrating details of step S81 in FIG. 17.

First of all, the BIOS 6 detects a set of the bus number of the root complex 13, device number and function number, (0,0, 0). The BIOS 6 assigns the bus number 1 to a downstream bus of the root complex 13 (step S91). The BIOS 6 next scans for the bus number 1 (step S92). The scan for a bus number N (N: natural number) is processing of searching devices having (N,0,0) to (N,31,7) as (bus number, device number and function number). That is, in order to perform the scan for the bus number N (N: natural number), the BIOS 6 attempts 256 (=32×8) accesses to the bus number N. The BIOS 6 detects a set of the bus number, device number and function number, (1,0,0), of the upstream P2P bridge 15. The BIOS 6 then assigns the bus number 2 to the downstream bus of the upstream P2P bridge 15 (step S93). The BIOS 6 performs scan for the bus number 2 (step S94).

The configuration processing unit 43 in the downstream P2P bridge 16 responses the four downstream P2P bridges 16-0 to 16-3 having (2,0,0) to (2,3,0) as the sets of bus numbers, device numbers and function numbers to the BIOS 6 on the basis of the configuration information (step S95). The configuration information refers to information describing the number of functions connected to a virtual slot.

The BIOS 6 detects the sets of bus numbers, device numbers and function numbers, (2,0,0) to (2,3,0), of the downstream P2P bridges 16-0 to 16-3 and assigns 3 to 6 as the downstream bus numbers of the downstream P2P bridges 16-0 to 16-3 (step S96). The BIOS 6 scans for the bus numbers 3 to 6 (step S97).

The configuration processing unit 43 in the downstream P2P bridge 16 hides the existence of the functions 24-0 to 24-3 (step S98). In other words, the configuration processing unit 43 returns an error status indicating that the functions 24-0 to 24-3 do not exist to the BIOS 6. This disables all of the functions 24-0 to 24-3 in the I/O device 2A.

After that, the hypervisor 4 initializes the downstream P2P bridges 16-0 to 16-3 (step S99). More specifically, the hypervisor 4 initializes the hot plug controllers 17-0 to 17-3. The hypervisor 4 assigns an interrupt number to each of the devices and sets an interrupt address associated with the interrupt number to the device memory space, as illustrated in FIG. 19. The hypervisor 4 may refer to the interrupt number included in an interrupt signal to identify the device issued the interrupt signal.

FIG. 20 is a flowchart illustrating details of step S83 in FIG. 17.

If instructed to add the function 24-1 in step S82 in FIG. 17, the configuration processing unit 43 functioning as a hot plug controller sets "1 (enable)" at the presence (existence) flag for the virtual slot register 46-1 corresponding to the function 24-1. This allows the configuration processing unit 43 to update the state of the virtual slot 17-1 (step S101). The configuration processing unit 43 issues an interrupt signal to the hypervisor 4 (step S102). The interrupt signal includes an interrupt number of the downstream P2P bridge 16-1 (or configuration table 44-1) corresponding to the function 24-1.

The hypervisor 4 refers to the state of the virtual slot 17-1 and detects the existence of the function 24-1 (step S103). More specifically, the hypervisor 4 transmits a type 0 configuration read packet to the downstream P2P bridge 16-1 having (2,1,0) as the set of the bus number, device number and function number. The configuration processing unit 43 receives the type-0 configuration read packet and returns the presence flag setting "1 (enable)" at the virtual slot register 46-1 within the configuration table 44-1 to the hypervisor 4. This allows the hypervisor 4 to refer to the state of the virtual slot 17-1.

The hypervisor 4 instructs the configuration processing unit 43 to enable the downstream port 32 (or I/O slot 22) (step S104). It is assumed here that the hypervisor 4 instructs the configuration processing unit 43 to supply power to the I/O device 2A. However, because power has already been supplied from the I/O slot 22 to the I/O device 2A, the configuration processing unit 43 ignores the instruction.

The hypervisor 4 performs scan for the bus number 4 assigned downstream of the downstream P2P bridge 16-1 including the virtual slot 17-1 (step S105). More specifically, the hypervisor 4 refers to "Secondary Bus Number" included in the configuration register 45-1 within the configuration table 44-1 to identify the bus number 4 assigned downstream of the downstream P2P bridge 16-1. The hypervisor 4 transmits a type 1 configuration read packet to the downstream side of the downstream P2P bridge 16-1 to search for the devices corresponding to (4,0,0) to (4,31,7).

The filter 41 transmits the response from the function 24-1 having (4,0,0) as (bus number, device number, function number) to the hypervisor 4 (step 106). More specifically, as illustrated in FIG. 12, the I/O device 2A does not have a function having (4,0,1) to (4,31,7) as (bus number, device number, function number). When the hypervisor 4 scans for (4,0,1) to (4,0,7), the filter 41 returns a response of an error status "Unsupported" to the hypervisor 4, instead of the I/O device 2A.

According to the PCI Express standard, the downstream P2P of a PCIe switch does not permit access with a device number equal to or higher than 1. For that, when the hypervisor 4 scans for the bus number 4 and device numbers 1 to 31, the bridge control unit 42 returns a response of an error status "Unsupported" to the hypervisor 4, instead of the I/O device 2A.

The hypervisor 4 receives the response from the function 24-1 to detect the function 24-1 (step S107). The hypervisor 4 assigns an address space to the function 24-1 and reads the corresponding driver 5-1 onto the memory 12 (step S108). The driver 105-1 initializes the function 24-1 (step S109). The processing up to this point only enables the function 24-1 within the I/O device 2A.

FIG. 21 is a flowchart illustrating details of step S84 in FIG. 17.

If instructed to delete the function 24-1 in step S82 in FIG. 17, the configuration processing unit 43 functioning as a hot plug controller sets "0(disable)" to the presence flag at the virtual slot register 46-1 corresponding to the function 24-1. This allows the configuration processing unit 43 to update the state of the virtual slot 17-1 (step S111). The configuration processing unit 43 issues an interrupt signal to the hypervisor 4 (step S112). The interrupt signal includes an interrupt number of the downstream P2P bridge 16-1 (or configuration table 44-1) corresponding to the function 24-1.

The hypervisor 4 refers to the state of the virtual slot 17-1 and detects the existence of the function 24-1 (step S113). More specifically, the hypervisor 4 transmits a type-0 configuration read packet to the downstream P2P bridge 16-1 having (2,1,0) as the set of the bus number, device number and function number. The configuration processing unit 43 receives the type-0 configuration read packet and returns the presence flag setting "0 (disable)" at the virtual slot register 46-1 within the configuration table 44-1 to the hypervisor 4. This allows the hypervisor 4 to refer to the state of the virtual slot 17-1.

The hypervisor 4 instructs the configuration processing unit 43 to disable the downstream port 32 (or I/O slot 22) (step S114). It is assumed here that the hypervisor 4 instructs the configuration processing unit 43 to stop power supply to the I/O device 2A. However, because power may be supplied to other functions, the configuration processing unit 43 ignores the instruction.

The hypervisor 4 deletes the driver 5-1 corresponding to the function 24-1 present in the address space (step S115). The processing up to this point only disables the function 24-1 within the I/O device 2A.

For example, the function 24-1 is assigned to the virtual machine 3-1 and is enabled and the functions 24-0, 24-2, and 24-3 are disabled, the hypervisor 4 is allowed to assign one of the functions 24-0, 24-2, and 24-3 to the virtual machine 3-0. The enable or disable a function independently is therefore meaningful.

According to the aforementioned embodiment, the server 1 uses the hypervisor 4 as a virtual OS. However, the server 1 may use an OS such as Windows (registered trademark) and UNIX (registered trademark). In this case, the processing to be executed by the hypervisor 4 is executed by the OS.

The present invention is not limited to the embodiment but may be changed variously without departing from the scope and spirit thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A switching circuit connected to an I/O device having a plurality of functions, the switching circuit comprising:
    a processing unit that includes tables, each of which corresponds to one of the functions of the I/O device, wherein when the processing unit receives a packet that instructs to add a function to the I/O device the processing unit selects the table that contains a bus number of a destination of the received packet, and notifies a number of the selected table; and
    a filter configured to change a function number of the destination of the received packet to the number of the table notified from the processing unit.

2. The switching circuit according to claim 1, wherein:
    when the filter receives a packet of a scan request for the I/O device from a hypervisor that is instructed to add a function to the I/O device, the filter allows a packet of a scan request for the function to pass through and transmits a response from the function to the hypervisor, while the filter blocks a packet of a scan request for a function excluding the function that is added to the I/O device and transmits an error response to the hypervisor.

3. The switching circuit according to claim 1, further comprising a control unit which controls the transfer of a packet received from the filter to a function on the basis of the table selected by the processing unit, wherein:
    when the received packet identifies the destination of the function with a set of a bus number, a device number and a function number, and includes data to be transferred to the function, the processing unit selects a table that contains the bus number included in the received packet, and notifies the filter of the number of the selected table which corresponds to the function number, and
    the filter changes the function number included in the received packet to the notified number of the table and transmits the packet having the changed function number to the control unit.

4. The switching circuit according to claim 1, wherein:
    when the received packet includes data having the destination of the packet identified with an address, the processing unit selects a table that contains the address included in the received packet; and
    a control unit controls the transfer of the received packet from the filter to the destination on the basis of the table selected by the processing unit.

5. The switching circuit according to claim 1 wherein when the received packet identifies the destination of a function with a set of a bus number, device number and function number and includes data to be read or written from or to a table, the processing unit selects a table that contains the device number included in the received packet and reads or writes data included in the transfer data from or to the selected table.

6. The switching circuit according to claim 1, wherein when packets corresponding to the function of the I/O device are received from the I/O device, the filter changes the function numbers included in the packets to 0 and transmits them to a the hypervisor.

7. An information processing apparatus including a switching circuit connected to an I/O device having a plurality of functions, the switching circuit comprising:
   a processing unit; and
   a filter; wherein
      the processing unit includes tables, each of which corresponds to one of the functions of the I/O device, when the processing unit receives a packet which instructs to add a function to the I/O device the processing unit selects a table that contains a bus number of a destination of the received packet, and notifies a number of the selected table to the filter; and
      the filter configured to change a function number of the destination of the received packet to the number of the table notified from the processing unit.

8. A control method for a switching circuit connected to an I/O device having a plurality of functions and including tables, each of which corresponds to one of the functions of the I/O device, and contains a-bus numbers of a destination of a packet, the method comprising:
   when a packet which instructs to add a function to the I/O device is received, selecting a table containing a bus number of the destination of the received packet; and
   changing a function number of the destination of the received packet to a number of the selected table.

* * * * *

UNITED STATES PATENT AND TRADEMARK OFFICE
CERTIFICATE OF CORRECTION

PATENT NO.       : 8,583,848 B2
APPLICATION NO.  : 13/195345
DATED            : November 12, 2013
INVENTOR(S)      : Takashi Miyoshi It is certified that error appears in the above-identified patent and that said Letters Patent is hereby corrected as shown below:

In the Claims:
In Column 17, Line 2, In Claim 5, after "in" delete "the".
In Column 17, Line 8, In Claim 6, after "a" delete "the".
In Column 18, Line 10, In Claim 8, after "contains" delete "a-".

Signed and Sealed this
Eighteenth Day of February, 2014

Michelle K. Lee
*Deputy Director of the United States Patent and Trademark Office*